US012724229B2

(12) United States Patent
Kim et al.

(10) Patent No.: US 12,724,229 B2
(45) Date of Patent: Sep. 1, 2026

(54) REFLECTIVE MODULE AND CAMERA MODULE INCLUDING REFLECTIVE MODULE

(71) Applicant: Samsung Electro-Mechanics Co., Ltd., Suwon-si (KR)

(72) Inventors: Jung Woo Kim, Suwon-si (KR); Nam Ki Park, Suwon-si (KR); Young Hwan Kwon, Suwon-si (KR); Soo Cheol Lim, Suwon-si (KR); Kum Kyung Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 824 days.

(21) Appl. No.: 18/079,185

(22) Filed: Dec. 12, 2022

(65) Prior Publication Data

US 2023/0185053 A1 Jun. 15, 2023

(30) Foreign Application Priority Data

Dec. 13, 2021 (KR) ........................ 10-2021-0177868
Jul. 1, 2022 (KR) ........................ 10-2022-0081402
Nov. 24, 2022 (KR) ........................ 10-2022-0159770

(51) Int. Cl.
*G02B 7/182* (2021.01)
*G02B 7/18* (2021.01)
(Continued)

(52) U.S. Cl.
CPC ......... *G02B 7/1821* (2013.01); *G02B 7/1805* (2013.01); *G02B 13/0065* (2013.01);
(Continued)

(58) Field of Classification Search
CPC .............. G02B 13/0065; G02B 13/007; G02B 7/1821; G02B 7/1805; G02B 27/646; G02B 7/198; G03B 17/17
See application file for complete search history.

(56) References Cited

U.S. PATENT DOCUMENTS

2006/0082674 A1* 4/2006 Noji .................... H04N 23/687 348/360
2018/0224665 A1* 8/2018 Im ........................... G02B 7/08
(Continued)

FOREIGN PATENT DOCUMENTS

CN 112394536 A 2/2021
CN 113495340 A * 10/2021 ............ G02B 7/198
(Continued)

OTHER PUBLICATIONS

Chinese Office Action issued Mar. 20, 2026 in counterpart Chinese Application CN 202211601463 (Year: 2026).*
(Continued)

*Primary Examiner* — Cara E Rakowski
(74) *Attorney, Agent, or Firm* — NSIP Law

(57) ABSTRACT

A camera module includes a first lens module including one or more lenses disposed along a first optical axis; and a reflective module into which light emitted from the first lens module is incident, wherein the reflective module includes a housing having an internal space; a rotatable holder supported in the housing in a first direction parallel to the first optical axis, and configured to be rotatable relative to the housing; a reflective holder supported in the rotatable holder in a second direction different from the first direction, and configured to be rotatable relative to the rotatable holder; a reflective member disposed on the reflective holder; and a first ball member forming a rotation axis of the rotatable
(Continued)

holder, and an imaginary line extending along the first optical axis passes through the first ball member.

31 Claims, 16 Drawing Sheets

(51) Int. Cl.

| | |
|---|---|
| ***G02B 13/00*** | (2006.01) |
| ***G02B 27/64*** | (2006.01) |
| ***G03B 5/00*** | (2021.01) |
| ***G03B 17/17*** | (2021.01) |
| ***H02K 11/215*** | (2016.01) |
| ***H02K 41/035*** | (2006.01) |

(52) U.S. Cl.
CPC ............. *G02B 27/646* (2013.01); *G03B 5/00* (2013.01); *G03B 17/17* (2013.01); *H02K 11/215* (2016.01); *H02K 41/0354* (2013.01); *G03B 2205/0023* (2013.01); *G03B 2205/0069* (2013.01)

(56) References Cited

U.S. PATENT DOCUMENTS

| | | | | |
|---|---|---|---|---|
| 2019/0129197 | A1 | 5/2019 | Kim et al. | |
| 2020/0333622 | A1 | 10/2020 | Fujisaki et al. | |
| 2020/0348479 | A1* | 11/2020 | Kwon | G03B 17/12 |
| 2021/0181460 | A1* | 6/2021 | Lee | G03B 17/17 |
| 2021/0199983 | A1 | 7/2021 | Kazuo | |
| 2021/0286193 | A1* | 9/2021 | Kwon | G02B 13/02 |
| 2022/0099922 | A1* | 3/2022 | Arai | G02B 7/1805 |
| 2022/0279093 | A1 | 9/2022 | Kwon et al. | |
| 2022/0350108 | A1* | 11/2022 | Shin | G03B 17/17 |
| 2022/0397808 | A1* | 12/2022 | Yedid | G03B 17/17 |

FOREIGN PATENT DOCUMENTS

| | | | |
|---|---|---|---|
| JP | 5997993 | B2 | 9/2016 |
| JP | 2020-177067 | A | 10/2020 |
| KR | 10-1942743 | B1 | 1/2019 |
| KR | 10-2226523 | B1 | 3/2021 |
| KR | 10-2021-0077656 | A | 6/2021 |

OTHER PUBLICATIONS

Machine translation of CN-113495340 A retrieved electronically from PE2E Search Apr. 3, 2026 (Year: 2021).*

Korean Office Action issued on Jun. 4, 2024, in counterpart Korean Patent Application No. 10-2022-0159770 (11 pages in English, 7 pages in Korean).

* cited by examiner

REFLECTIVE MODULE AND CAMERA MODULE INCLUDING REFLECTIVE MODULE

CROSS-REFERENCE TO RELATED APPLICATIONS

This application claims the benefit under 35 USC 112(a) of Korean Patent Application Nos. 10-2021-0177868 filed on Dec. 13, 2021, 10-2022-0081402 filed on Jul. 1, 2022, and 10-2022-0159770 filed on Nov. 24, 2022, in the Korean Intellectual Property Office, the entire disclosures of which are incorporated herein by reference for all purposes.

BACKGROUND

1. Field

The present disclosure relates to a reflective module and a camera module including a reflective module.

2. Description of Related Art

A camera module provided in a mobile device is manufactured to have an improved performance compared to a conventional camera. In particular, in accordance with an increase in a frequency of capturing an image using a mobile device, there is an increased demand for a camera module capable of providing a high zoom magnification.

The camera module is capable of adjusting a zoom magnification by moving a lens module. In order to achieve high zoom magnification, it is necessary to sufficiently secure a movement distance of light incident into a camera to an image sensor, that is, an overall length or a total track length (TTL). In order to achieve a long total track length, the overall length of the camera may increase. However, a size of a mobile device has been increasingly reduced, and accordingly, there is a spatial limitation in sufficiently increasing a length of a camera module.

Therefore, there has been a demand for a structure capable of forming an optical path as long as possible without increasing the overall length of the camera module or while reducing the overall length of the camera module.

In addition, a recent camera module includes a movable or rotatable reflector capable of refracting or reflecting light to achieve a long optical path and to perform an optical image stabilization function. In order to refract or reflect light using the reflector, it is required to accurately sense its position because the reflector needs to be finely adjusted. To this end, the camera module may include a position sensor capable of detecting an amount of movement of the reflector.

However, the conventional camera module has a problem that, if the position of the reflector is misaligned by just a small amount due to an external impact or the like, a position sensing accuracy is greatly reduced.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a first lens module including one or more lenses disposed along a first optical axis; and a reflective module into which light emitted from the first lens module is incident, wherein the reflective module may include a housing having an internal space; a rotatable holder supported in the housing in a first direction parallel to the first optical axis, and configured to be rotatable relative to the housing; a reflective holder supported in the rotatable holder in a second direction different from the first direction, and configured to be rotatable relative to the rotatable holder; a reflective member disposed on the reflective holder; and a first ball member forming a rotation axis of the rotatable holder, and an imaginary line extending along the first optical axis passes through the first ball member.

The camera module may further include a pair of magnetic bodies configured to provide a magnetic force to support the reflective holder in the rotatable holder, wherein one body of the pair of magnetic bodies may be disposed on the reflective holder, and another body of the pair of magnetic bodies may be disposed on the rotating holder, and the pair of magnetic bodies face each other in the second direction.

The camera module may further include a plurality of second ball members disposed between the reflective holder and the rotatable holder and forming a rotation axis of the reflective holder.

The camera module may further include a plurality of accommodation grooves formed in either one or both of the reflective holder and the rotatable holder, wherein the plurality of second ball members may be respectively disposed in the plurality of accommodation grooves in the second direction.

The rotation axis of the reflective holder may pass through the plurality of second ball members, and the reflective member may be disposed between the plurality of second ball members.

The camera module may further include a driving magnet and a driving coil configured to rotate the reflective holder, wherein the driving magnet may be disposed on the reflective holder and the driving coil may be disposed on the housing, or the driving magnet may be disposed on the housing and the driving coil may be disposed on the reflective holder.

The reflective holder may include an extension disposed between the rotatable holder and the housing, the driving coil may be disposed on the housing, and the driving magnet may be disposed on the extension facing the driving coil in the second direction.

The camera module may further include a position sensor disposed on the housing and facing the driving magnet in the second direction.

The driving magnet may be configured so that a surface of the driving magnet facing the driving coil has an N pole, a neutral region, and an S pole arranged in the first direction, and the position sensor may face the neutral region.

The driving magnet may be disposed between the pair of magnetic bodies and the driving coil.

The camera module may further include a driving magnet and a driving coil configured to rotate the rotatable holder; and a magnetic body configured to provide a magnetic force by interacting with the driving magnet to support the rotatable holder in the housing, wherein the magnetic body and the driving magnet may face each other in the first direction with the driving coil interposed therebetween.

The camera module may further include a position sensor facing the driving magnet in the first direction.

The camera module may further include an accommodation groove formed in either one or both of the housing and the rotatable holder and supporting the first ball member at three or more points.

The camera module may further include a plurality of guide ball members configured to guide a rotation of the rotatable holder, wherein the plurality of guide ball members may be movable relative to the first ball member in a direction perpendicular to the first direction.

The camera module may further include a damper disposed on the reflective holder and protruding toward the first lens module.

The camera module may further include a second lens module into which the light emitted from the reflective member is incident, the second lens module including one or more lenses disposed along a second optical axis, wherein the second optical axis may be parallel to the second direction.

In another general aspect, a camera module includes a first lens module and a second lens module having different optical axes; and a reflective module disposed on an optical path from the first lens module to the second lens module, wherein the reflective module may include a housing having an internal space; a rotatable holder disposed in the internal space of the housing and configured to be rotatable about a first rotation axis; a reflective holder configured to be rotatable relative to the rotatable holder about a second rotation axis perpendicular to the first rotation axis, and a reflective member disposed on the reflective holder.

The rotatable holder may be supported in the housing in a first direction parallel to the first rotation axis by a first magnetic force, and the reflective holder may be supported in the rotatable holder in a second direction perpendicular to the first direction by a second magnetic force.

The camera module may further include a first driving magnet disposed on the rotatable holder; and a first pulling yoke disposed on the housing, and the first magnetic force may be generated by the first driving magnet and the first pulling yoke.

The reflective module may further include a pair of magnetic bodies configured to generate the second magnetic force, and the pair of magnetic bodies may be configured to rotate together with the rotatable holder as the rotatable holder rotates.

The pair of magnetic bodies may include a first magnetic body disposed on the rotatable holder; and a second magnetic body disposed on the reflective holder and facing the first magnetic body in the second direction.

The reflective module may further include a second driving magnet and a second driving coil configured to rotate the reflective holder, and the first magnetic body may be disposed between the second driving magnet and the second magnetic body.

The first magnetic body may be a pulling magnet, and the second magnetic body may be a second pulling yoke.

In another general aspect, a reflective module includes a rotatable holder configured to be rotatable about a first axis; a reflective holder coupled to the rotatable holder and configured to be rotatable about a second axis perpendicular to the first axis; a reflective member coupled to the reflective holder; a first magnetic body disposed on the reflective holder; and a second magnetic body disposed on the rotatable holder, wherein the first magnetic body and the second magnetic body face each other in a direction parallel to a third axis, and the third axis is perpendicular to both the first axis and the second axis.

The first magnetic body may be disposed between the second axis and the second magnetic body.

The reflective module may further include a driving magnet disposed on the reflective holder; a driving coil configured to interact with the driving magnet; and a position sensor configured to detect a movement of the driving magnet.

The first magnetic body, the second magnetic body, the driving magnet, and the position sensor may be disposed in a direction parallel to the third axis.

The reflective module may further include a housing having an internal space and an opening in the housing exposing the internal space, wherein the rotatable holder may be disposed in the housing; and the driving coil and the position sensor may be exposed to the internal space of the housing through the opening in the housing.

The reflective module may further include a ball member through which the second axis passes, wherein the ball member may be disposed between a first accommodation groove formed in the rotatable holder and a second accommodation groove formed in the reflective holder, and the first accommodation groove and the second accommodation groove may face each other in a direction parallel to the third axis.

In another general aspect, a camera module includes the reflective module described above; a first lens module having a first optical axis parallel to the first axis; and a second lens module having a second optical axis parallel to the third axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
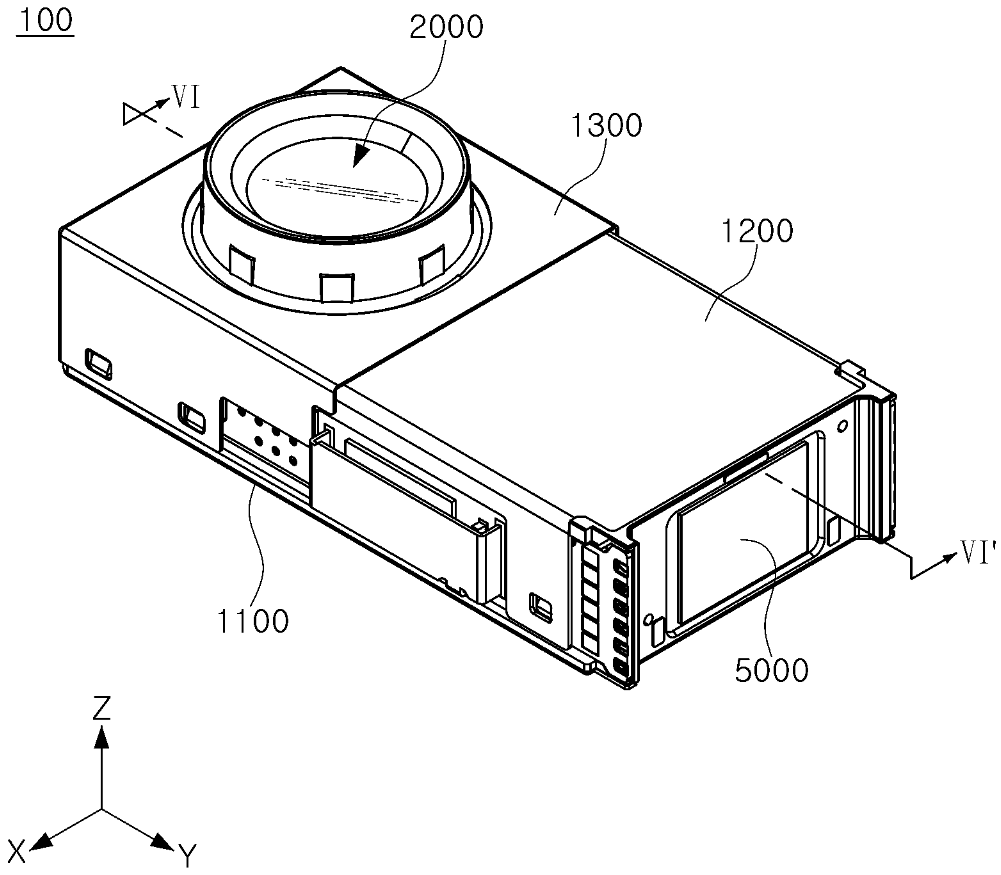
FIG. 1 is a perspective view of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Figure 2:
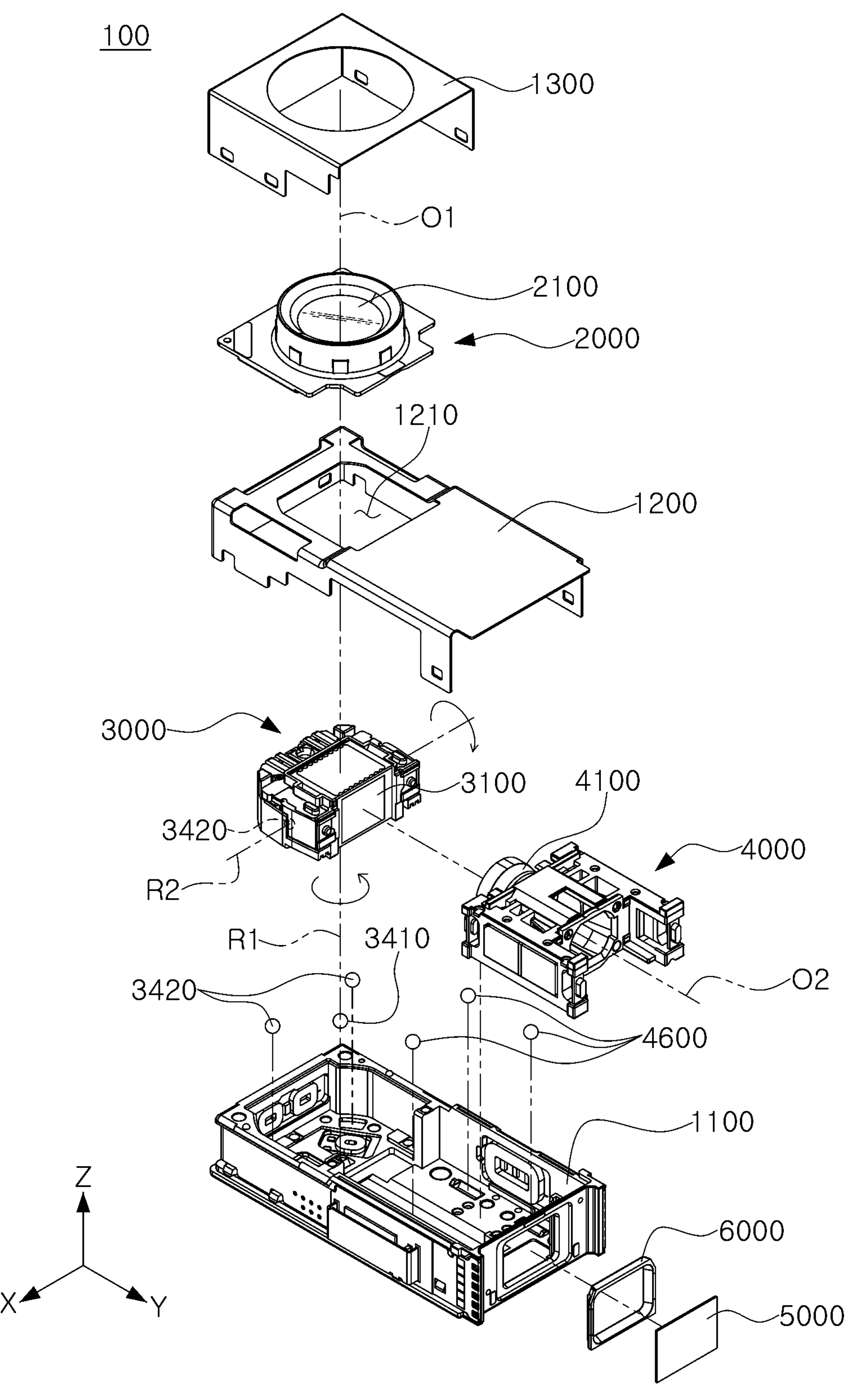
FIG. 2 is an exploded perspective view of the camera module.
Figure 3:
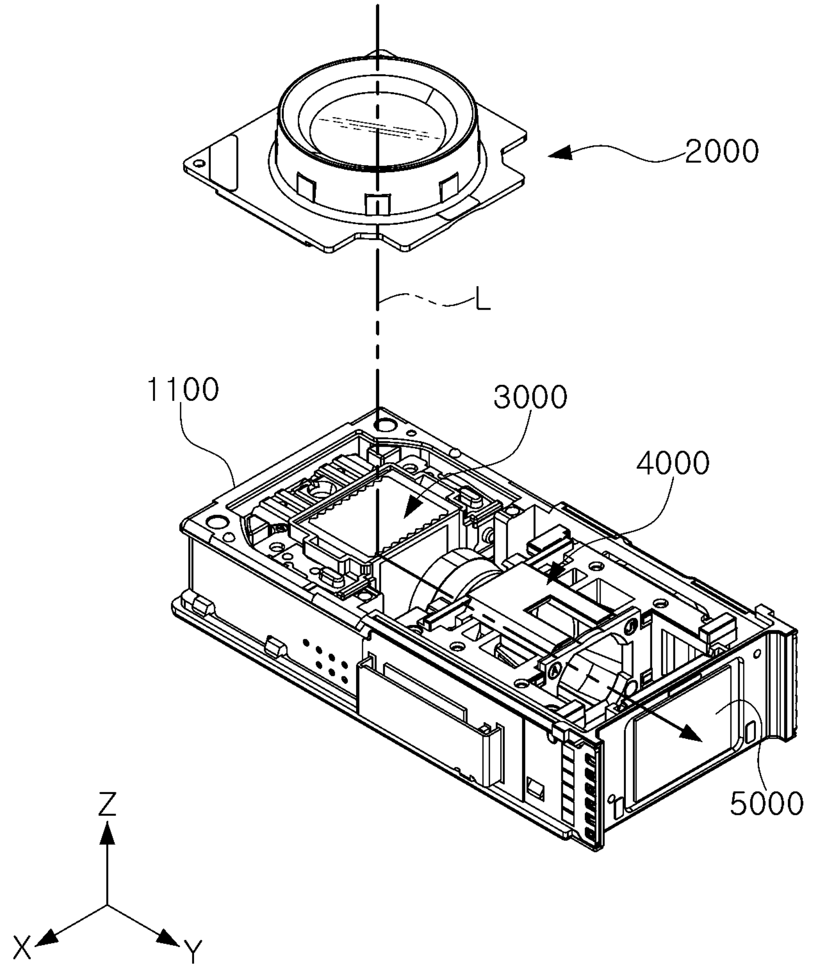
FIG. 3 illustrates an arrangement relationship between a first lens module, a reflective module, and a second lens module of the camera module.

FIG. 1 is a perspective view of a camera module 100. FIG. 2 is an exploded perspective view of the camera module 100. FIG. 3 illustrates an arrangement relationship between a first lens module 2000, a reflective module 3000, and a second lens module 4000 of the camera module 100. Referring to FIGS. 1 through 3, the camera module 100 may include a housing 1100, a reflective module 3000, a plurality of lens modules 2000 and 4000, and an image sensor 5000.

The camera module 100 may include a plurality of lens modules 2000 and 4000. The plurality of lens modules 2000 and 4000 may include a first lens module 2000 and a second lens module 4000 having different optical axes. Light incident from an external subject into the camera module 100 may be incident to the image sensor 5000 through the first lens module 2000 and the second lens module 4000.

An optical axis O1 (hereinafter referred to as a first optical axis O1) of the first lens module 2000 and an optical axis O2 (hereinafter referred to as a second optical axis O2) of the second lens module 4000 may not be parallel to each other. For example, the first lens module 2000 and the second lens module 4000 may be disposed so that the first optical axis O1 and the second optical axis O2 intersect each other. The first optical axis O1 and the second optical axis O2 may be substantially perpendicular to each other, but an angle between the first optical axis O1 and the second optical axis O2 is not limited thereto.

Lenses included in the first lens module 2000 or the second lens module 4000 may be configured to be movable relative to the image sensor 5000. For example, the lenses 2100 included in the first lens module 2000 may be configured to be movable along the first optical axis O1. Alternatively, the lenses included in the second lens module 4000 may be configured to be movable along the second optical axis O2. As the lenses included in each of the lens modules 2000 and 4000 move, an optical image stabilization (01S) or auto focus (AF) function of the camera module 100 may be performed. For example, the camera module 100 may perform an auto focus function by moving the lenses of the second lens module 4000 in the second optical axis O2 direction.

At least one of the lenses included in the first lens module 2000 or the second lens module 4000 may be positioned to be fixed to the housing 1100. For example, in the camera module 100, the lenses 2100 included in the first lens module 2000 may be fixed to the housing 1100, and the lenses included in the second lens module 4000 may be configured to be movable in the second optical axis O2 direction.

In the camera module 100, a reflective module 3000 for changing a propagation direction of light emitted from the first lens module 2000 to a direction parallel to the second optical axis O2 may be disposed. For example, referring to FIG. 2, the reflective module 3000 for changing a light propagation path may be disposed between the first lens module 2000 and the second lens module 4000. That is, the camera module 100 may include a reflective module 3000 disposed in an optical path from the first lens module 2000 to the second lens module 4000.

The reflective module 3000 may be accommodated in an internal space of the housing 1100 to change a path of light incident to the reflective module 3000. The reflective module 3000 may be understood as a concept including a reflective member 3100 for changing a path of light, components supporting and driving the reflective member 3100, and at least a part of the housing 1100 accommodating them.

The reflective member 3100 of the reflective module 3000 may be configured to change a light propagation path by refracting or reflecting light. For example, the reflective member 3100 may be a prism or a mirror refracting or reflecting light to change an optical path.

The reflective member 3100 may change a light propagation path so that light emitted from the first lens module 2000 is directed toward the second lens module 4000. For example, the reflective member 3100 may change a propagation path of light incident along the first optical axis O1 to a direction substantially parallel to the second optical axis O2. Accordingly, a propagation path of incident light L incident from the outside of the camera module 100 into the first lens module 2000 as illustrated in FIG. 3 may be changed while passing through the reflective module 3000 so that the light is incident into the second lens module 4000. The incident light L may be appropriately refracted while passing through the second lens module 4000 and incident onto the image sensor 5000.

The reflective member 3100 may be configured to be rotatable or movable within the housing 1100. The path of the light L may be appropriately changed as the reflective member 3100 rotates or moves. The camera module 100 may perform an optical image stabilization (01S) function by rotating or moving the reflective member 3100.

The reflective member 3100 may be configured to be rotatable in different directions about a plurality of rotation axes. For example, the reflective member 3100 may rotate about a first rotation axis R1 parallel to the first optical axis O1, and the reflective member 3100 may also rotate about a second rotation axis R2 perpendicular to both the first optical axis O1 and the second optical axis O2. By this rotation, the reflective member 3100 may change a light propagation path to a direction substantially parallel to the second optical axis O2.

In the following description, the first rotation axis R1 may be simply referred to as the "first axis", and the second rotation axis R2 may be simply referred to as the "second axis". That is, unless otherwise expressed as "optical axis", the "first axis" and the "second axis" may be understood to be the "first rotation axis" and the "second rotation axis" of the reflective module 3000.

In addition, an axis perpendicular to both the first rotation axis and the second rotation axis is defined as a "third axis". For example, the second optical axis O2 may be substantially parallel to the third axis.

The camera module 100 may include an image sensor 5000 into which the light having passed through the reflective module 3000 and the plurality of lens modules 2000 and 4000 is incident. The image sensor 5000 may convert the incident light into image information. The image sensor 5000 may be disposed so that a light collection surface thereof faces a light emission surface of the second lens module 4000, and may generate an electrical signal corresponding to the light incident from the second lens module 4000.

The image sensor 5000 may be accommodated inside the housing 1100 or disposed outside the housing 1100.

A filter unit 6000 for filtering at least some of the light incident from the lens module 4000 may be disposed in front of the image sensor 5000. The filter unit 6000 may include an optical filter (e.g., an infrared light blocking filter) capable of blocking light having a specific wavelength. Alternatively, the filter unit 6000 may include a light blocking member (baffle) for blocking at least some of the light incident from the lens module.

Although not illustrated in FIG. 2, in order to make the optical path longer, the camera module 100 may further include another reflective module disposed between the lens module and the image sensor 5000 to change the optical path.

The housing 1100 may have an internal space for accommodating any one or any combination of any two or more of the reflective module 3000, the plurality of lens modules 2000 and 4000, and the image sensor 5000. The housing 1100 may be made of a material having a predetermined rigidity to protect the components disposed therein. The housing 1100 may be a box-shaped member with an upper side thereof being open. However, the material and the shape of the housing 1100 are not limited thereto.

The camera module 100 may include a shield can 1200 covering the upper side of the housing 1100. The shield can 1200 may cover the open upper side of the housing 1100 to protect the components inside the housing 1100 from an external environment.

The shield can 1200 may include an 1210 opening through which incident light passes. For example, as illustrated in FIG. 2, the shield can 1200 may include an opening 1210 disposed between the first lens module 2000 and the reflective module 3000. The light emitted from the first lens module 2000 may be incident into the reflective module 3000 under the first lens module 2000 through the opening 1210.

In the camera module 100 according to example embodiments, one of the plurality of lens modules 2000 and 4000 may be disposed outside the housing 1100, and another one of the plurality of lens modules 2000 and 4000 may be disposed inside the housing 1100. For example, as illustrated in FIG. 2 or 3, the first lens module 2000 may be coupled to an external side of the housing 1100 and positioned above the reflective module 3000, and the second lens module 4000 may be disposed inside the housing 1100. In this case, a light emission surface of a lens included in the first lens module 2000 may be disposed to face a light incidence surface of the reflective member 3100 included in the reflective module 3000.

The first lens module 2000 disposed on the external side of the housing 1100 and the second lens module 4000 disposed inside the housing 1100 may have optical axes O1 and O2 intersecting each other. The reflective module 3000 may be disposed between the first lens module 2000 and the second lens module 4000 to change the path of the light propagating in the first optical axis O1 direction to the second optical axis O2 direction. By disposing the plurality of lens modules 2000 and 4000 to have optical axes O1 and O2 intersecting each other, an overall length of the camera module 100 can be reduced as compared to an overall length in a case in which the plurality of lens modules 2000 and 4000 are disposed parallel to each other along the same optical axis.

In a case in which some of the lens modules are disposed outside of the housing 1100, the camera module 100 may further include a component for structurally or optically stabilizing the lens modules disposed outside the housing 1100. For example, the camera module 100 may further include a cover 1300 capable of shielding a space between the first lens module 2000 and the housing 1100 separated from each other.

In FIGS. 2 and 3, the second lens module 4000 and the reflective module 3000 are disposed inside one housing 1100, but this is merely an example. For example, the lens modules 2000 and 4000 and the reflective module 3000 may be respectively disposed in a plurality of separate housings, to form separate parts, and then the separate parts may be assembled together to form a complete camera module 100. The image sensor 5000 may also be provided in the housing separately from the reflective module 3000 or the lens modules 2000 and 4000. In this case, the individual parts may be defined as a lens module assembly, a reflective module assembly, and an image sensor assembly, respectively. That is, the camera module 100 may include a reflective module assembly including the reflective module 3000, a lens module assembly including one or more lens modules 2000 and 4000, and an image sensor assembly.

Figure 4:
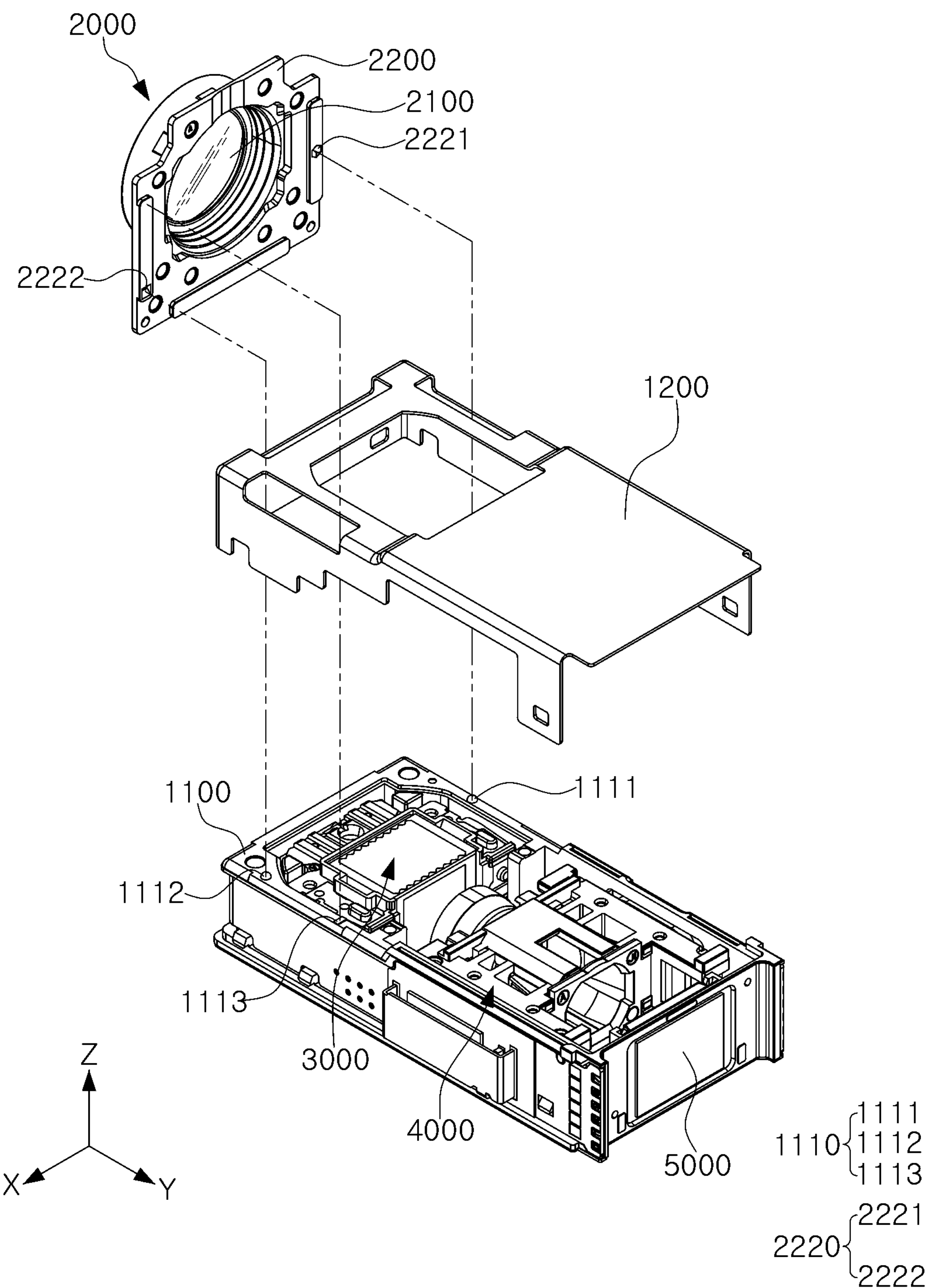
FIG. 4 is a reference diagram illustrating a state in which the first lens module is coupled to a housing of the camera module.
Figure 5:
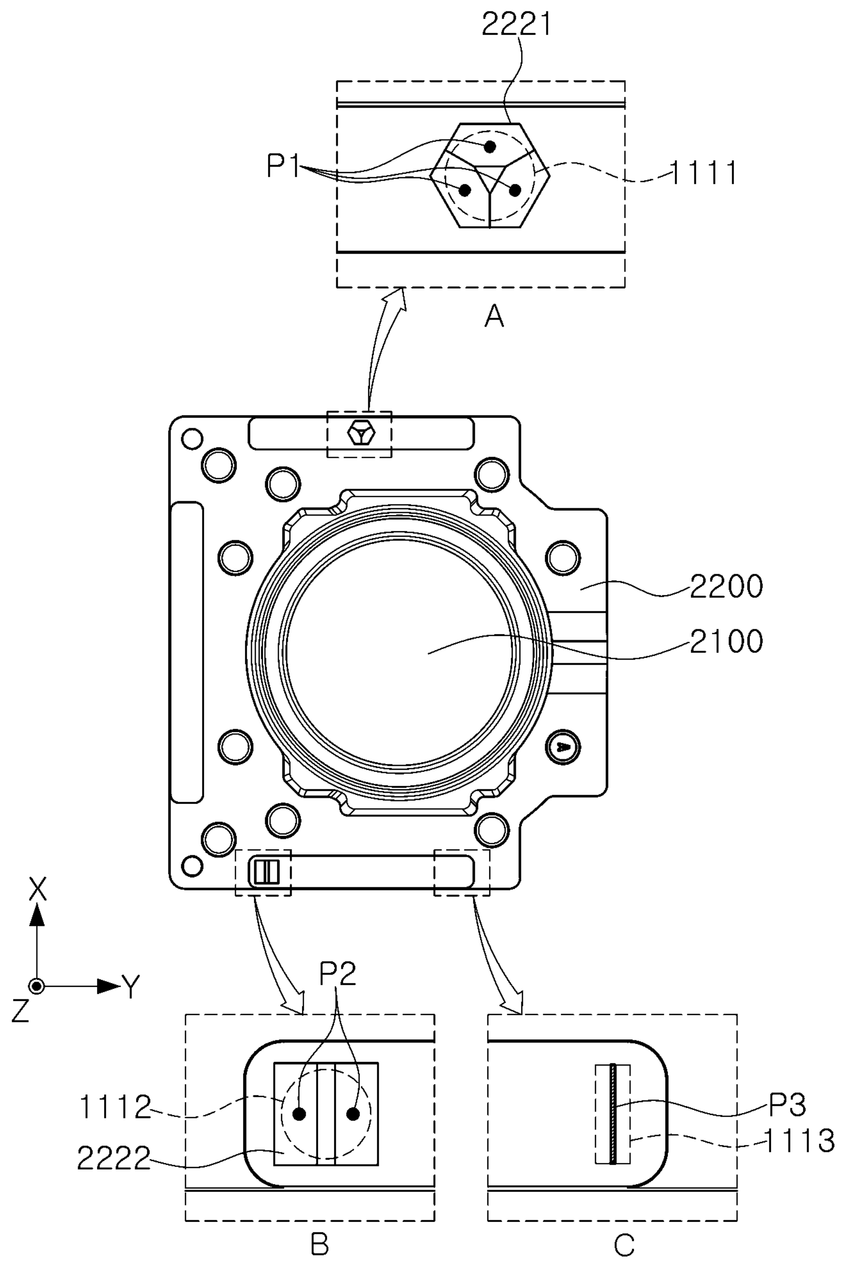
FIG. 5 is a bottom view of the first lens module.
Figure 6:
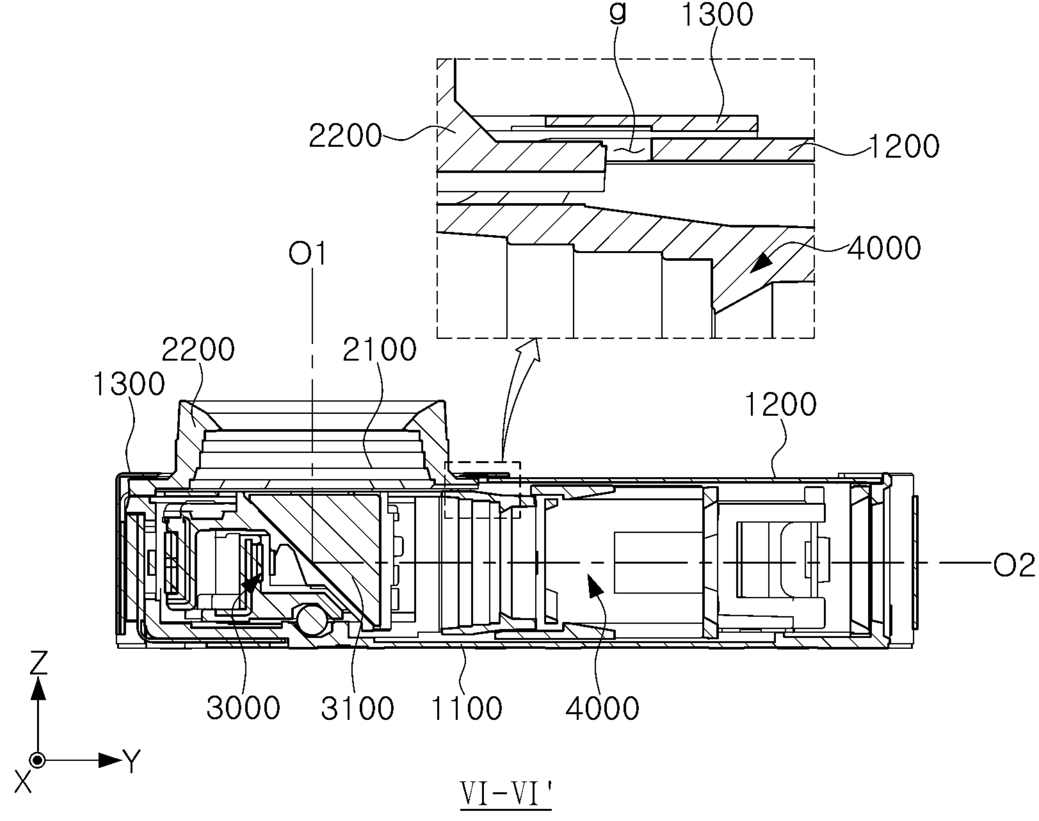
FIG. 6 is a cross-sectional view taken along the line VI-VI' of FIG. 1.

FIG. 4 is a reference diagram illustrating a state in which the first lens module 2000 is coupled to the housing 1100 of the camera module 100. FIG. 5 is a bottom view of the first lens module 2000. FIG. 6 is a cross-sectional view taken along the line VI-VI' of FIG. 1. Since the first lens module 2000 and the camera module 100 including the same to be described with reference to FIGS. 4 through 6 correspond to the first lens module 2000 and the camera module 100 described with reference to FIGS. 1 through 3 above, any overlapping description may be omitted.

The first lens module 2000 may include one or more lenses 2100 disposed along the first optical axis O1 and a first lens holder 2200 in which the lenses 2100 are accommodated. Light entering from an external subject may be refracted by the lens 2100 of the first lens module 2000 and incident into the reflective module 3000. In the camera module 100, the first lens module 2000 may be disposed in front of the reflective module 3000. The light emission surface of the lens 2100 included in the first lens module 2000 may face the reflective member 3100. Accordingly, the first lens module 2000 may emit light received from an external subject to the reflective module 3000.

The first lens module 2000 may be disposed so that the first optical axis O1 passes through the reflective member 3100 of the reflective module 3000.

The first lens module 2000 may be disposed outside the housing 1100 in which the reflective module 3000 is disposed. For example, referring to FIG. 4, the first lens module 2000 may be coupled to the upper side of the housing 1100 in which the reflective module 3000 is disposed. However, differently from what is illustrated in the drawings, the first lens module 2000 may be disposed in front of the reflective module 3000 inside the housing 1100 in which the reflective module 3000 is disposed.

In the camera module 100 according to example embodiments, since the first lens module 2000 and the second lens module 4000 are spaced apart from each other with the reflective module 3000 interposed therebetween, there is a concern that the first optical axis O1 and the second optical axis O2 may be misaligned. In addition, there is a concern that the first lens module 2000 may not be assembled at a correct position due to a tolerance generated during the manufacturing and assembling process of the camera module 100. If the first optical axis O1 and the second optical axis O2 are misaligned, or if the first lens module 2000 is not disposed at a correct position, there is a concern that the resolution of the camera module 100 may deteriorate or noise may be generated in image information acquired through the camera module 100. Therefore, there is a need for a structure capable of assembling the first lens module 2000 at a correct position as accurately as possible despite the tolerance inevitably generated during the manufacturing process.

To this end, the camera module 100 may include a plurality of guide protrusions 1110 and a plurality of guide grooves 2220 for guiding the first lens module 2000 to its assembly position. For example, as illustrated in FIG. 4, the plurality of guide protrusions 1110 and the plurality of guide grooves 2220 for guiding the first lens module 2000 to a correct assembly position are respectively disposed on and formed in coupling surfaces of the housing 1100 and the first lens module 2000.

The plurality of guide protrusions 1110 and the plurality of guide grooves 2220 may include a first guide protrusion 1111 disposed on one of the housing 1100 and the first lens module 2000, and a first guide groove 2221 disposed on the other one of the housing 1100 and the first lens module 2000.

The first guide protrusion 1111 may protrude in a direction perpendicular to the coupling surface. For example, as illustrated in FIG. 4, the first guide protrusion 1111 protruding toward the first lens module 2000 may be disposed on a portion of an upper surface of the housing 1100 to be brought into contact with the first lens module 2000.

A plurality of guide protrusions 1110 may be provided. For example, as illustrated in FIG. 4, a first guide protrusion 1111, a second guide protrusion 1112, and a third guide protrusion 1113 may be disposed on the upper surface of the housing 1100.

The plurality of guide protrusions 1110 may have different shapes. For example, the first guide protrusion 1111 and the second guide protrusion 1112 may have a hemispherical shape, and the third guide protrusion 1113 may have a rectangular shape having a flat surface. However, the specific shapes of the plurality of guide protrusions 1110 are not limited to what has been described above.

The plurality of guide grooves 2220 into which the plurality of guide protrusions 1110 are to be inserted may be formed in a member to be brought into contact with the member on which the guide protrusions 1110 are disposed.

In the process of assembling the first lens module 2000 to the housing 1100, the plurality of guide protrusions 1110 may be brought into contact with the plurality of guide grooves 2220, thereby guiding the first lens module 2000 to a correct position.

An alignment structure between the first lens module 2000 and the housing 1100 will be described in more detail with reference to FIGS. 4 and 5.

As illustrated in part A of FIG. 5, the first guide protrusion 1111 of the housing 1100 may be in three-point contact with the first guide groove 2221 of the first lens module 2000 at three points P1. Accordingly, a relative position of the first guide groove 2221 with respect to the first guide protrusion 1111 may be constrained in three directions (an X-axis direction, a Y-axis direction, and a Z-axis direction).

In addition, as illustrated in part B of FIG. 5, the second guide protrusion 1112 of the housing 1100 may be in two-point contact with a second guide groove 2222 of the first lens module 2000 at two points P2. Accordingly, a position of the second guide groove 2222 with respect to the second guide protrusion 1112 may be constrained in two directions (the Y-axis direction and the Z-axis direction) with a degree of freedom in at least one direction (the X-axis direction).

In addition, as illustrated in part C of FIG. 5, the third guide protrusion 1113 of the housing 1100 may be in line contact or surface contact with a portion of a surface of the first lens module 2000 at a line or a surface P3. Accordingly, a position of the portion of the surface with respect to the third guide protrusion 1113 may be constrained in one direction (the Z-axis direction).

The first guide groove 2221 and the first guide protrusion 1111 may contact each other to not only form a first support point of the first lens module 2000 but also provide a reference position for the first lens module 2000. The second guide groove 2222 and the second guide protrusion 1112 may contact each other to not only form a second support point of the first lens module 2000 but also constrain the first lens module 2000 not to rotate on the first support point above the housing 1100. In addition, the third guide protrusion 1113 may contact the portion of the surface of the first lens module 2000 to form a third support point of the first lens module 2000 so that the first lens module 2000 is guided to be finally seated in a stable manner at the correct position on the housing 1100.

The coupling structure of the first lens module 2000 may have a degree of freedom in at least one direction (e.g., the X-axis direction) at the second support point formed by the second guide protrusion 1112, and may have a degree of freedom in at least two directions (e.g., the X-axis direction and the Y-axis direction) at the third support point formed by the third guide protrusion 1113. Accordingly, even if there is a manufacturing tolerance of the plurality of guide protrusions 1110 and the plurality of guide grooves 2220, the first lens module 2000 may be stably seated without being distorted or shaken.

After the first lens module 2000 is seated on the housing 1100 as described above, a process of completely fixing the position of the first lens module 2000 may be performed. For example, after the first lens module 2000 is aligned at the correct position in a state in which an adhesive material is applied onto the coupling surface, the adhesive material on the coupling surface may be cured through a UV treatment process. As the adhesive material is cured, the first lens module 2000 may be firmly fixed to the housing 1100. However, the order of these processes is not limited to what has been described above. For example, the process of aligning the first lens module 2000 and the process of curing the adhesive material may be performed simultaneously.

Because the first lens module 2000 is disposed on the external side of the housing 1100, a gap g may exist between the shield can 1200 and the first lens module 2000. For example, as illustrated in FIG. 6, a gap g may be formed in a boundary portion between the first lens holder 2200 of the first lens module 2000 and the shield can 1200. In order to prevent unnecessary external light or foreign matter from entering the housing 1100 through this gap g, the camera module 100 may further include a cover 1300 shielding the gap g between the shield can 1200 and the first lens module 2000. The cover 1300 may cover the gap g between the first lens module 2000 and the housing 1100 to prevent leakage of light or inflow of foreign matter. The cover 1300 may be hooked over tabs on the shield can 1200 or the housing 1100, but the specific coupling method is not limited thereto.

In addition, the cover 1300 may cover at least a portion of the first lens module 2000 to protect the first lens module 2000 from external forces or to protect coupled portions of the first lens module 2000 and the housing 1100.

Figure 7:
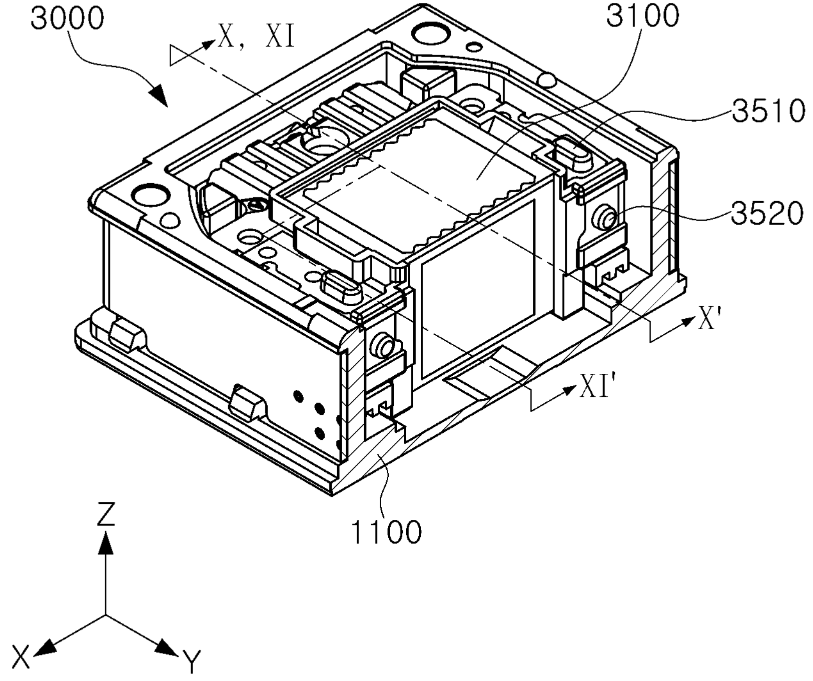
FIG. 7 is a perspective view illustrating a state in which the reflective module is disposed in the housing.
Figure 8:
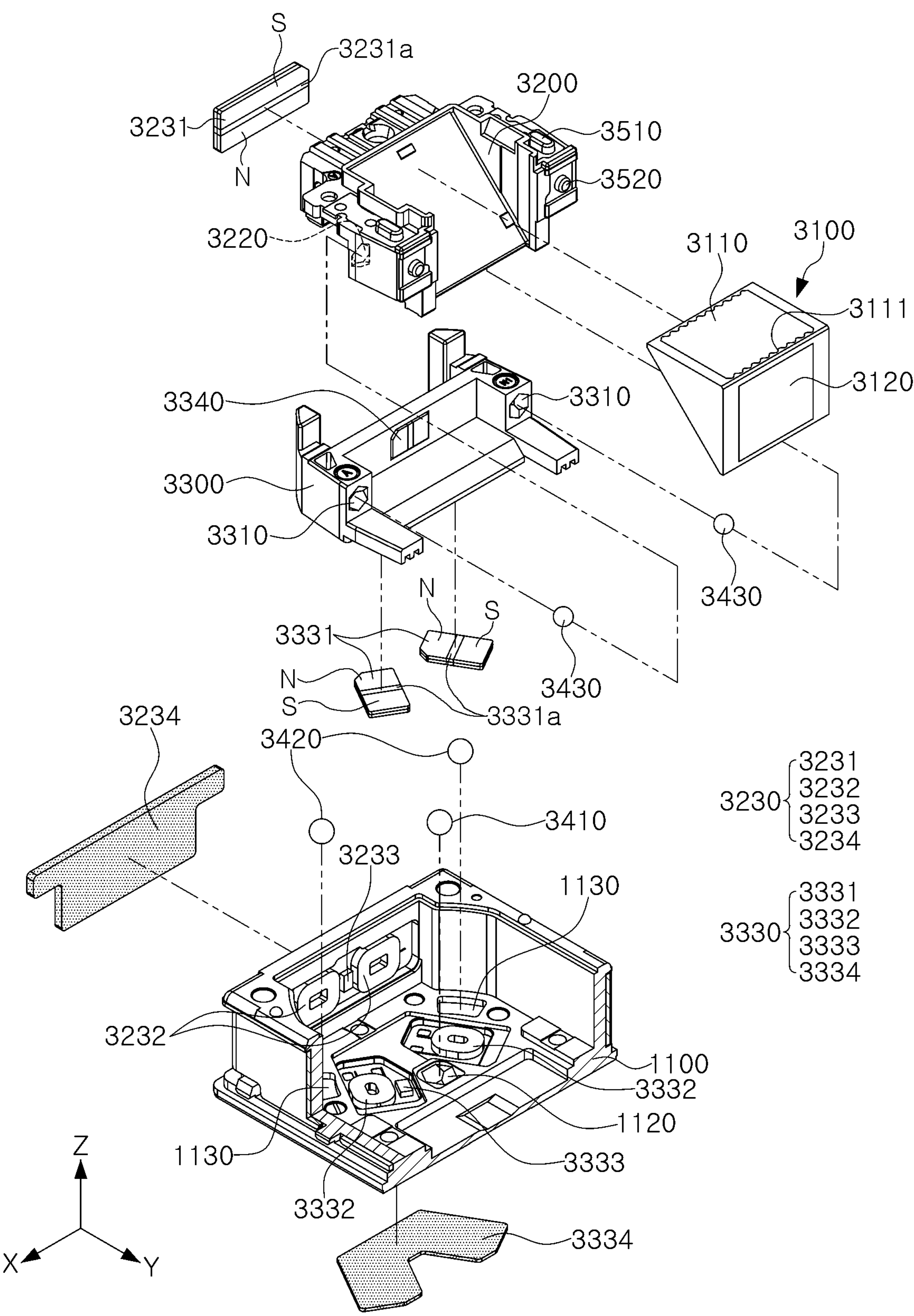
FIG. 8 is an exploded perspective view of the reflective module.
Figure 9:
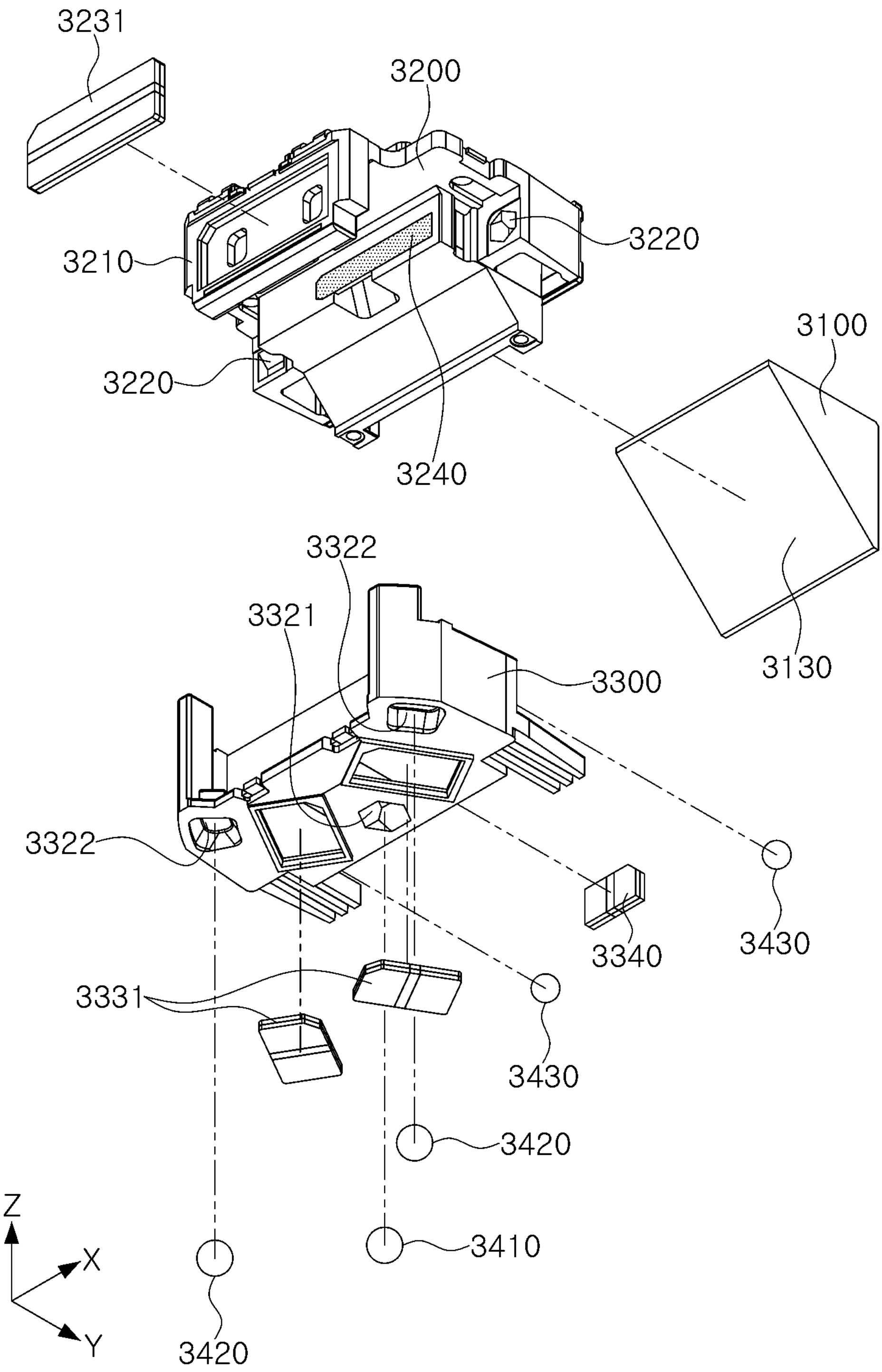
FIG. 9 is an exploded perspective view of a rotatable holder and a reflective holder of the reflective module.
Figure 10:
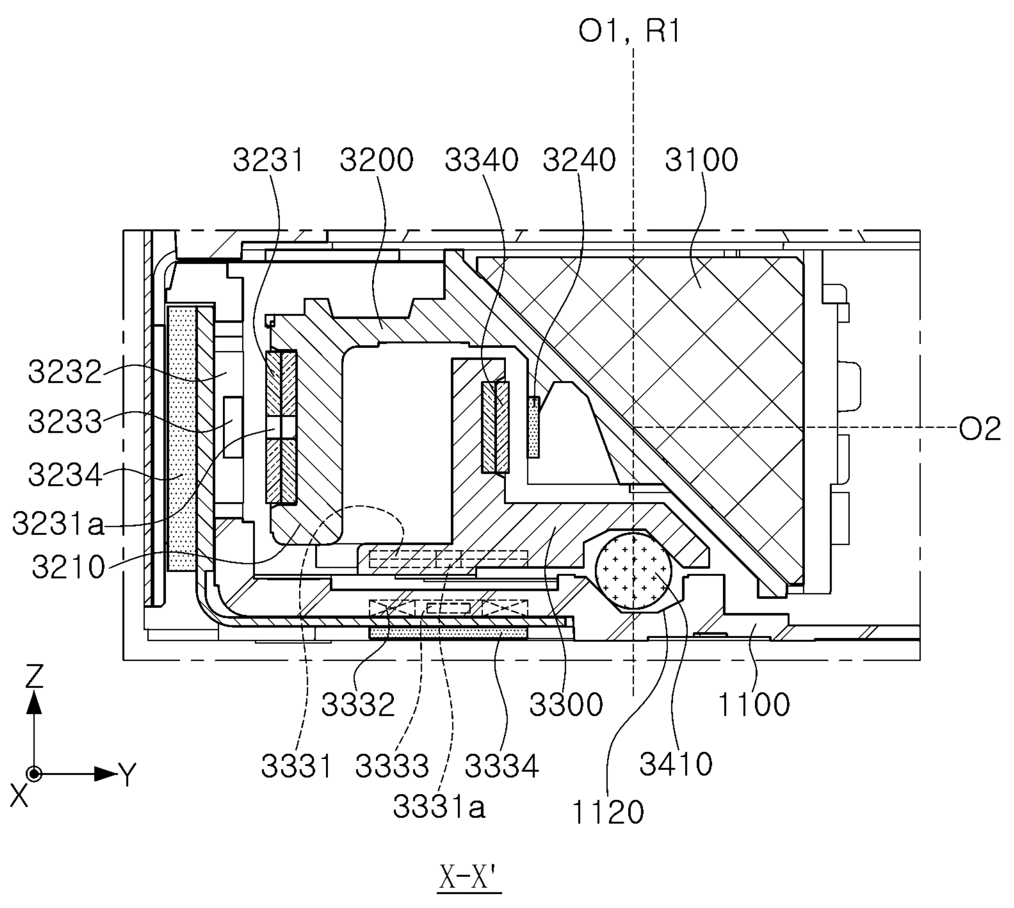
FIG. 10 is a cross-sectional view taken along the line X-X' of FIG. 7.
Figure 11:
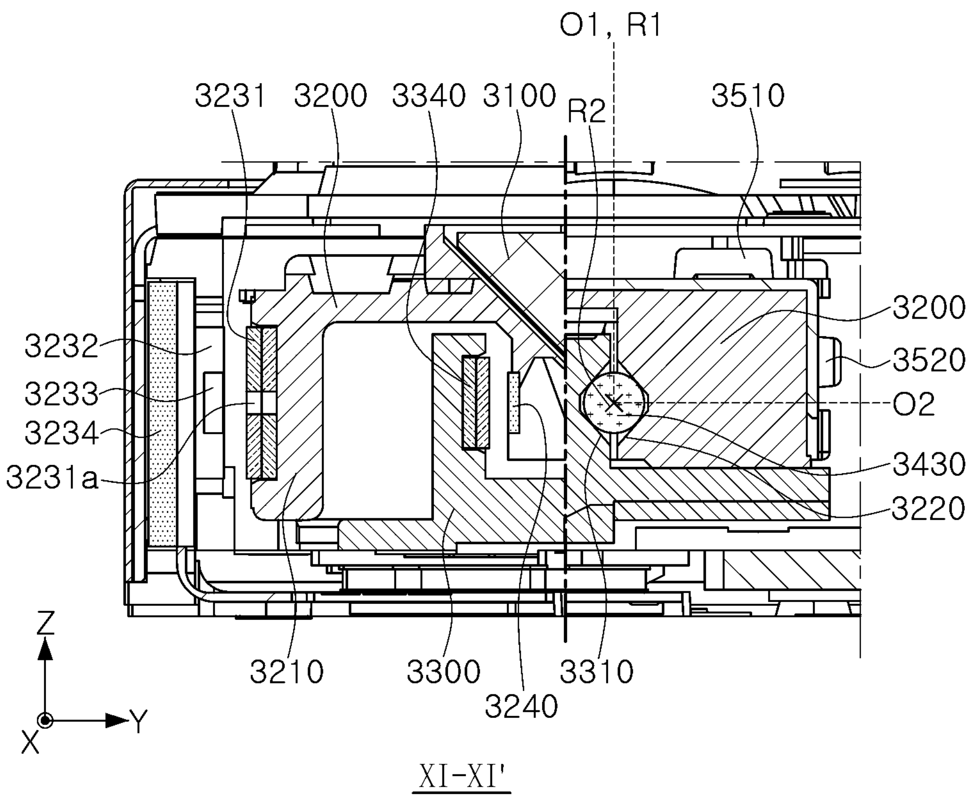
FIG. 11 is a cross-sectional view taken along the line XI-XI' of FIG. 7.

Hereinafter, the reflective module 3000 included in the camera module 100 will be described in detail with reference to FIGS. 7 through 11. FIG. 7 is a perspective view illustrating a state in which the reflective module 3000 is disposed in the housing 1100. FIG. 8 is an exploded perspective view of the reflective module 3000. FIG. 9 is an exploded perspective view of a rotatable holder 3300 and a reflective holder 3200 of the reflective module 3000. FIG. 10 is a cross-sectional view taken along the line X-X' of FIG. 7. FIG. 11 is a cross-sectional view taken along the line XI-XI' of FIG. 7. Since the reflective module 3000 and the camera module 100 including the same to be described with reference to FIGS. 7 through 11 correspond to the reflective module 3000 and the camera module 100 described with reference to FIGS. 1 through 6 above, any overlapping description may be omitted.

Referring to FIG. 7, the reflective module 3000 may be disposed in the housing 1100, and may include a reflective member 3100 capable of changing a light path. The reflective member 3100 may include a light incident surface 3110 through which light is incident from the first lens module 2000 and a light emission surface 3120 through which light is emitted.

The reflective member 3100 may be configured to be movable inside the housing 1100. For example, the reflective member 3100 may rotate about different rotation axes R1 and R2 as shown in FIG. 2. There is a concern that if the reflective member 3100 collides with another structure (e.g., an inner wall of the housing 1100 or the shield can 1200) of the camera module 100 while rotating in various directions, the reflective member 3100 may be damaged by the impact, and noise may be generated due to an irregular impact sound.

To prevent such problems, the reflective module 3000 may include a first damper 3510 and a second damper 3520 protruding in various directions. For example, referring to FIG. 7, the reflective module 3000 may include the first damper 3510 protruding in a first direction and the second damper 3520 protruding in a second direction different from the first direction. The first damper 3510 and the second damper 3520 of the reflective module 3000 may include a material capable of absorbing an impact energy, thereby reducing the impact or the noise (the irregular impact sound) generated when the reflective module 3000 hits the inner wall of the housing 1100 or the shield can 1200.

Referring to FIGS. 8 through 11, the reflective module 3000 may include a reflective member 3100 capable of changing a light path, a reflective holder 3200 movably supporting the reflective member 3100, and a rotatable holder 3300.

The reflective member 3100 may refract or reflect incident light to change a light propagation path.

The reflective member 3100 may include a light incident surface 3110 through which light is incident, a light reflection surface 3130 by which the light is reflected, and a light emission surface 3120 through which the reflected light is emitted. For example, light incident on the light incident surface 3110 in the first direction (the Z-axis direction) may be emitted in the second direction (the Y-axis direction) after being reflected by the light reflection surface 3130. The first direction (the Z-axis direction) may be substantially parallel to the first optical axis O1 of the first lens module 2000, and the second direction (the Y-axis direction) may be substantially parallel to the second optical axis O2 of the second lens module 4000.

The reflective member 3100 may include a light blocking unit 3111 blocking unnecessary light to reduce a flare phenomenon. For example, as illustrated in FIG. 8, the light blocking unit for blocking unnecessary light may be disposed along edges of the light incident surface 3110 of the reflective member 3100. However, the position of the light blocking unit 3111 is not limited to what is illustrated, and it may be disposed on the light emission surface 3120. Also, although not illustrated in the drawings, a light blocking member capable of performing a similar role as the light blocking unit 3111 may be disposed, independently from the light blocking unit 3111, to be spaced apart from the reflective member 3100. For example, the light blocking member may be a baffle disposed between the reflective member 3100 and each of the lens modules 2000 and 4000.

The reflective member 3100 may be disposed in the reflective holder 3200. The reflective holder 3200 may rotate or move while supporting the reflective member 3100. For example, the reflective holder 3200 may rotate about the second rotation axis R2 passing through at least two ball members 3430, and accordingly the reflective member 3100 disposed in the reflective holder 3200 may also rotate together with the reflective holder 3200.

The reflective module 3000 may further include a rotatable holder 3300 movably or rotatably supporting the reflective holder 3200. The rotatable holder 3300 may be configured not only to rotatably support the reflective holder 3200, but also to be rotatable or movable relative to the housing 1100. For example, the reflective holder 3200 may be rotatably supported in the rotatable holder 3300 by at least two ball members 3430 forming a rotation axis being interposed therebetween. In addition, the rotatable holder 3300 may be supported in the housing 1100 by at least one ball member 3410 interposed therebetween, and thus may rotate relative to the housing 1100 about another rotation axis formed by the at least one ball member 3410. In order to distinguish the rotation axes from each other in the following description, the rotation axis of the rotatable holder 3300 will be referred to as the first rotation axis R1 shown in FIG. 2, and the rotation axis of the reflective holder 3200 will be referred to as the second rotation axis R2 shown in FIG. 2.

In the reflective module 3000 according to example embodiments, the first rotation axis R1 and the second rotation axis R2 may be different from each other. For example, the first rotation axis R1 and the second rotation axis R2 may be substantially perpendicular to each other.

The first rotation axis R1 may pass through the light incident surface 3110 and the light reflection surface 3130 of the reflective member 3100. The second rotation axis R2 may be substantially parallel to the light reflection surface 3130 of the reflective member 3100. For example, the second rotation axis R2 may be disposed on the light reflection surface 3130 or may be disposed in parallel with the light reflection surface 3130 at a predetermined distance.

In the reflective module 3000, the first rotation axis R1 and the second rotation axis R2 may be configured to meet each other at a point. In this case, the point at which the first rotation axis R1 and the second rotation axis R2 meet each other may be disposed on the light reflection surface 3130 of the reflective member 3100 or disposed adjacent to the light reflection surface 3130.

When the reflective module 3000 is at a neutral position, the light incident surface 3110 of the reflective member 3100 may be substantially perpendicular to the first optical axis O1 of the first lens module 2000, and the light emission surface 3120 of the reflective member 3100 may be substantially perpendicular to the second optical axis O2 of the second lens module 4000. In this case, the first rotation axis R1 of the reflective module 3000 may substantially coincide with the first optical axis O1, and the second rotation axis R2 of the reflective module 3000 may be perpendicular to both the first optical axis O1 and the second optical axis O2. Like the intersection point between the first rotation axis R1 and the second rotation axis R2, an intersection point between the first optical axis O1 and the second optical axis O2 may also be disposed on the light reflection surface 3130 of the reflective member 3100 or may be disposed in parallel with the light reflection surface 3130 at a predetermined distance.

Even if the camera module 100 is shaken by an external force and light is incident in a direction misaligned with the first optical axis O1, the reflective member 3100 may be appropriately rotated to change a light propagation direction to be substantially parallel to the second optical axis O2.

The reflective module 3000 may further include a support member supporting the reflective holder 3200 on the rotatable holder 3300. For example, the support member may include a pair of magnetic bodies 3240 and 3340 disposed to face each other to generate a magnetic attraction therebetween, and the reflective holder 3200 may be supported in the rotatable holder 3300 by virtue of the magnetic attraction or a magnetic repulsion generated between the pair of magnetic bodies 3240 and 3340.

The pair of magnetic bodies 3240 and 3340 may be separately disposed on the reflective holder 3200 and the rotatable holder 3300, respectively. For example, as illustrated in FIGS. 8 and 9, the pair of magnetic bodies 3240 and 3340 may include a pulling yoke 3240 disposed on the reflective holder 3200 and a pulling magnet 3340 disposed on the rotatable holder 3300. In this case, the pulling magnet 3340 and the pulling yoke 3240 may generate a magnetic attraction for pulling each other, and the reflective holder 3200 may be supported in the rotatable holder 3300 by the ball members 3430 interposed therebetween by virtue of the magnetic attraction.

However, the configuration of the pair of magnetic bodies 3240 and 3340 is not limited to what has been described above. For example, the pulling magnet 3340 and the pulling yoke 3240 may be disposed on the reflective holder 3200 and the rotatable holder 3300, respectively. Alternatively, both of the pair of magnetic bodies 3240 and 3340 may be pulling magnets.

The support member is not limited to the magnetic bodies 3240 and 3340 described above, and may have any configuration as long as the reflective holder 3200 can be movably supported in the rotatable holder 3300.

In example embodiments, the reflective module 3000 may include driving units 3230 and 3330 driving the reflective holder 3200 and the rotatable holder 3300, respectively. For example, as illustrated in FIG. 8, the reflective module 3000 may include a first driving unit 3330 driving the rotatable holder 3300 and a second driving unit 3230 driving the reflective holder 3200.

Each of the first driving unit 3330 and the second driving unit 3230 may include a driving coil and a driving magnet. For example, the first driving unit 3330 may rotate the rotatable holder 3300 by an electromagnetic interaction between a first driving coil 3332 and a first driving magnet 3331 facing each other. Also, the second driving unit 3230 may rotate the reflective holder 3200 by an electromagnetic interaction between a second driving coil 3232 and a second driving magnet 3231 facing each other.

In the camera module 100, the driving magnets and the driving coils may be respectively disposed on the two components that move relative to each other. For example, the first driving magnet 3331 may be disposed on the rotatable holder 3300, and the first driving coil 3332 may be disposed on the housing 1100. The second driving magnet 3231 may be disposed on the reflective holder 3200, and the second driving coil 3232 may be disposed on the housing 1100.

The driving units 3230 and 3330 may include position sensors 3233 and 3333 capable of detecting movement amounts of the driving magnets 3231 and 3331, respectively. For example, the first driving unit 3330 may include a first position sensor 3333 facing the first driving magnet 3331. The first position sensor 3333 may be disposed next to and parallel to the first driving coil 3332 as shown in FIG. 8, or disposed inside the first driving coil 3332. Similarly, the second driving unit 3230 may include a second position sensor 3233 facing the second driving magnet 3231. The second position sensor 3233 may be disposed next to and parallel to the second driving coil 3232 as shown in FIG. 8, or disposed inside the second driving coil 3232.

At the neutral position of the reflective module 3000, the position sensors 3233 and 3333 may be positioned to face neutral regions 3231*a* and 3331*a* of the driving magnets 3231 and 3331, respectively. Each of the neutral regions 3231*a* and 3331*a* of the driving magnets 3231 and 3331 may be a boundary region between two different magnetic polarities (i.e., an N pole and an S pole).

The driving units 3230 and 3330 may further include a first yoke 3334 and a second yoke 3234 facing the driving magnets 3231 and 3331, respectively. For example, as illustrated in FIG. 8, the first yoke 3334 may be disposed on a rear surface of the first driving coil 3332 facing the first driving magnet 3331. The second yoke 3234 may be disposed on a rear surface of the second driving coil 3232 facing the second driving magnet 3231. The first yoke 3334 and the second yoke 3234 may serve to concentrate the magnetic flux of the driving magnets.

However, the configuration of the driving units 3230 and 3330 of the reflective module 3000 is not limited to what has been described above, and the driving units 3230 and 3330 of the reflective module 3000 may have any configuration as long as the reflective holder 3200 and the rotatable holder 3300 can be moved.

Hereinafter, the rotatable holder 3300 included in the reflective module 3000 will be described in more detail.

The reflective module 3000 may include a rotatable holder 3300 rotatable relative to the housing 1100. The rotatable holder 3300 may rotate relative to the housing 1100 while rotatably supporting the reflective holder 3200 and the reflective member 3100. For example, the rotatable holder 3300 may be disposed to be rotatable about the first rotation axis R1, and accordingly, the reflective holder 3200 and the reflective member 3100 may also rotate about the first rotation axis R1 together with the rotatable holder 3300.

A plurality of ball members 3410 and 3420 rotatably supporting the rotatable holder 3300 may be disposed between the rotatable holder 3300 and the housing 1100.

The plurality of ball members 3410 and 3420 may include a first ball member 3410 forming a rotation axis (hereinafter referred to as the first rotation axis R1) of the rotatable holder 3300, and guide ball members 3420 helping the rotatable holder 3300 stably rotate.

The first ball member 3410 may form a first rotation axis R1 while rotating in place in a state in which its position is fixed with respect to the housing 1100. Therefore, the first rotation axis R1 may pass through the first ball member 3410.

The first rotation axis R1 may substantially coincide with the first optical axis O1 of the first lens module 2000 facing the reflective module 3000. Accordingly, an imaginary line extending along the first optical axis O1 may pass through the first ball member 3410.

The first ball member 3410 may be accommodated in a first accommodation groove 1120 of the housing 1100. In order to fix the position of the first ball member 3410, the first accommodation groove 1120 may be configured to support the first ball member 3410 at three or more points. For example, the first accommodation groove 1120 may be a groove having at least three inclined surfaces, and the first ball member 3410 may be supported in point-contact with each of the inclined surfaces. Accordingly, the first ball member 3410 may be supported by at least three points in the first accommodation groove 1120. In addition, a groove 3321 facing the first accommodation groove 1120 and having the same shape as the first accommodation groove 1120 may be formed in the rotatable holder 3300. Accordingly, the first ball member 3410 may form a first rotation axis R1 while rotating in place in a sandwiched state between the rotatable holder 3300 and the housing 1100.

One or more guide ball members 3420 may be arranged. For example, as illustrated in FIGS. 8 and 9, the reflective module 3000 may include two guide ball members 3420 spaced apart from the first ball member 3410. The guide ball member 3420 may move in a rolling manner relative to the housing 1100 or the rotatable holder 3300, and may support the rotatable holder 3300 to be rotatable while maintaining a predetermined spacing between the bottom surface of the rotatable holder 3300 and a bottom surface of the housing 1100.

The guide ball member 3420 may be accommodated in a guide groove 1130 (hereinafter referred to as the third guide groove) formed in the housing 1100. The guide ball member 3420 may be supported at two points or at one point in the third guide groove 1130. The guide ball member 3420 may be movable along the third guide groove 1130. The third guide groove 1130 may be disposed to extend in a circumferential direction of the first rotation axis R1. Alternatively, the third guide groove 1130 may be disposed to extend in a tangential direction of a circumference about the first rotation axis R1.

Another guide groove 3322 (hereinafter referred to as the fourth guide groove) accommodating the guide ball member 3420 may be formed in a lower surface of the rotatable holder 3300. Accordingly, the guide ball member 3420 may support the rotatable holder 3300 while moving in a rolling manner in a sandwiched state between the fourth guide groove 3322 of the rotatable holder 3300 and the third guide groove 1130 of the housing 1100.

A driving force for rotating the rotatable holder 3300 may be generated by the first driving unit 3330. For example, the first driving unit 3330 may include a first driving magnet 3331 disposed in the rotatable holder 3300, a first driving coil 3332 disposed in the housing 1100, and a first yoke 3334, and the driving force may be generated by an electromagnetic interaction between the first driving magnet 3331 and the first driving coil 3332.

The first driving magnet 3331 and the first driving coil 3332 may be disposed to face each other in the first direction (the Z-axis direction). The first direction (Z-axis direction) may be a direction substantially parallel to the first rotation axis R1, which is a rotation axis of the rotatable holder 3300.

The first driving coil 3332 may be disposed on the bottom surface of the housing 1100. A plurality of first driving coils 3332 may be disposed to be spaced apart from each other in the circumferential direction of the first rotation axis R1, or the first driving coil 3332 may be configured as an integrated coil having a portion extending in the circumferential direction of the first rotation axis R1. The first driving coil 3332 may be disposed between the first ball member 3410 and the guide ball members 3420.

The first driving magnet 3331 may be disposed on the lower surface of the rotatable holder 3300 to face the first driving coil 3332. The first driving magnet 3331 may be configured so that different magnetic polarities are sequentially arranged along a rotation direction of the rotatable holder 3300. For example, the first driving magnet 3331 may be configured so that a surface thereof facing the first driving coil 3332 has an N pole, a neutral region, and an S pole sequentially arranged along the rotation direction of the rotatable holder 3300.

The first driving unit 3330 may include a first position sensor 3333 detecting a position of the first driving magnet 3331. The first position sensor 3333 may be a magnetic sensor disposed inside or outside the first driving coil 3332. For example, the first position sensor 3333 may include a Hall sensor. The first position sensor 3333 may detect an amount of movement of the first driving magnet 3331 by detecting a change in a magnetic flux of the first driving magnet 3331 passing through the first position sensor 3333.

When the rotatable holder 3300 is at a neutral position, the first position sensor 3333 may be disposed to face the neutral region 3331*a* of the first driving magnet 3331. That is, the first position sensor 3333 may be disposed to face a boundary region between the N pole and the S pole of the first driving magnet 3331, thereby effectively detecting a displacement of the first driving magnet 3331.

A plurality of first position sensors 3333 may be arranged to more precisely detect a change in a position of the first driving magnet 3331 by comparing signals detected by the first position sensors 3333 with each other.

The first driving unit 3330 may include a first yoke 3334 facing the first driving magnet 3331. For example, as illustrated in FIG. 8, the first yoke 3334 may be disposed on the rear surface of the first coil to face the first driving magnet 3331 in the first direction (the Z-axis direction).

The first yoke 3334 may be made of a magnetic material. Accordingly, the first yoke 3334 may not only serve to concentrate lines of magnetic force generated by the first driving magnet 3331, but may also serve to generate a magnetic attraction by interacting with the first driving magnet 3331. Hereinafter, the magnetic force generated between the first driving magnet 3331 and the first yoke 3334 is defined as a first magnetic force.

Since the first yoke 3334 and the first driving magnet 3331 are disposed to face each other in the first direction (the Z-axis direction), the first yoke 3334 may attract the first driving magnet 3331 in the first direction (the Z-axis direction). That is, the first yoke 3334 may serve as a pulling yoke. The rotatable holder 3300 may be supported in the housing 1100 in the first direction (the Z-axis direction) by the first magnetic force generated between the first yoke 3334 and the first driving magnet 3331.

However, the support structure of the rotatable holder 3300 is not limited to what has been described above. For example, in another embodiment, the reflective module 3000 may further include a separate magnetic body (not illustrated) supporting the rotatable holder 3300 by generating a magnetic attraction or a magnetic repulsion together with the first yoke 3334.

The reflective module 3000 may include a reflective holder 3200 rotatable relative to the rotatable holder 3300. The reflective member 3100 may be fixed to the reflective holder 3200 to rotate together with the reflective holder 3200 relative to the rotatable holder 3300. For example, the reflective holder 3200 may be disposed to be rotatable about the second rotation axis R2, which is substantially perpendicular to the first rotation axis R1, and accordingly the reflective holder 3200 and the reflective member 3100 may also rotate about the second rotation axis R2 together with the rotatable holder 3300.

A plurality of ball members 3430 guiding the rotation of the reflective holder 3200 may be disposed between the reflective holder 3200 and the rotatable holder 3300. For example, as illustrated in FIG. 8, a plurality of second ball members 3430 forming a second rotation axis R2, which is a rotation axis of the reflective holder 3200, may be disposed between the reflective holder 3200 and the rotatable holder 3300.

The plurality of second ball members 3430 may be disposed to be spaced apart from each other in a direction perpendicular to the first rotation axis R1.

The plurality of second ball members 3430 may be disposed to be spaced apart from each other in a direction perpendicular to both the first optical axis O1 of the first lens module 2000 and the second optical axis O2 of the second lens module 4000.

The plurality of second ball members 3430 may form a second rotation axis R2 while rotating in place in a state in which their positions are fixed with respect to the reflective holder 3200 or the rotatable holder 3300. The second rotation axis R2 may pass through the plurality of second ball members 3430.

The reflective member 3100 may be disposed between the second ball members 3430. In this case, a plane extending from the light reflection surface 3130 of the reflective member 3100 may pass through the second ball members 3430. However, the arrangement of the reflective member 3100 is not limited to what has been described above. For example, the reflective member 3100 may be disposed so that the light reflection surface 3130 faces at least one of the second ball members 3430.

The rotatable holder 3300 and the reflective holder 3200 may include accommodation grooves 3310 and 3220, respectively, capable of accommodating the second ball member 3430. For example, the rotatable holder 3300 may include a second accommodation groove 3310 disposed in a surface thereof facing the reflective holder 3200 to accommodate a portion of the second ball member 3430, and the reflective holder 3200 may include a third accommodation groove 3220 disposed in a surface thereof facing the rotatable holder 3300 to accommodate the another portion of the second ball member 3430. The second accommodation groove 3310 of the rotatable holder 3300 and the third accommodation groove 3220 of the reflective holder 3200 may be disposed to face each other in the second direction (the Y-axis direction). A plurality of second accommodation grooves 3310 and a plurality of third accommodation grooves 3220 may be arranged to correspond to the number of second ball members 3430.

In example embodiments, in order to accurately align the relative positions of the reflective holder 3200 and the rotatable holder 3300, at least one of the plurality of second accommodation grooves 3310 and the plurality of third accommodation grooves 3220 may be configured to support the second ball member 3430 at three or more points. For example, at least one of the plurality of second accommodation grooves 3310 may be a groove having at least three inclined surfaces, and the other one may be a groove having at least two inclined surfaces. The second ball member 3430 may be supported in point-contact with each of the inclined surfaces. Accordingly, the second ball member 3430 may be supported by at least three points in the second accommodation groove 3310 having three inclined surfaces, and may be supported by two points in the second accommodation groove 3310 having two inclined surfaces. According to this support structure, the second ball member 3430 has a degree of freedom in one direction in any one of the plurality of second accommodation grooves 3310, making it possible to overcome a defect caused by a manufacturing tolerance.

A driving force for rotating the reflective holder 3200 may be generated by the second driving unit 3230. For example, the second driving unit 3230 may include a second driving magnet 3231 disposed on one of the reflective holder 3200 and the housing 1100 and a second driving coil 3232 disposed on the other one of the reflective holder 3200 and the housing 1100, and the driving force may be generated by an electromagnetic interaction between the second driving magnet 3231 and the second driving coil 3232. However, the arrangement of the second driving magnet 3231 and the second driving coil 3232 is not limited to what has been described above. For example, the second driving magnet 3231 may be disposed on the housing 1100, and the second driving coil 3232 may be disposed on the reflective holder 3200. Alternatively, the second driving magnet 3231 may be disposed on the reflective holder 3200, and the second driving coil 3232 may be disposed on the rotatable holder 3300.

The second driving magnet 3231 and the second driving coil 3232 may be disposed to face each other in the second direction (the Y-axis direction). The second direction (the Y-axis direction) may be substantially parallel to the second optical axis O2, which is an optical axis of the second lens module 4000. Alternatively, the second direction (the Y-axis direction) may be substantially perpendicular to the first rotation axis R1, which is a rotation axis of the rotatable holder 3300.

In the second driving magnet 3231, different magnetic polarities may be sequentially arranged along a rotation direction of the reflective holder 3200. For example, the second driving magnet 3231 may be magnetized to have an N pole, a neutral region, and an S pole sequentially along the rotation direction of the reflective holder 3200.

The second driving coil 3232 may be disposed on a sidewall of the housing 1100 to face the second driving magnet 3231. A second yoke 3234 may be disposed on the rear surface of the second driving coil 3232 so that lines of magnetic force generated by the second driving magnet 3231 pass through the second driving coil 3232 more intensively. The second yoke 3234 may be made of a magnetic material to concentrate the lines of magnetic force generated by the second driving magnet 3231.

The second driving unit 3230 may include a second position sensor 3233 detecting a position of the second driving magnet 3231. For example, the reflective module 3000 may include a second position sensor 3233 disposed inside or outside the second driving coil 3232 to face the second driving magnet 3231.

The second position sensor 3233 may be a magnetic sensor. For example, the second position sensor 3233 may include a Hall sensor. The second position sensor 3233 may detect an amount of movement of the second driving magnet 3231 by detecting a change in a magnetic flux of the second driving magnet 3231 passing through the second position sensor 3233. When the reflective holder 3200 is at a neutral position, the second position sensor 3233 may be disposed to face the neutral region 3231*a* of the second driving magnet 3231. That is, the second position sensor 3233 may be disposed to face a boundary region between the N pole and the S pole of the second driving magnet 3231, thereby effectively detecting a displacement of the second driving magnet 3231.

A plurality of second position sensors 3233 may be arranged to more precisely detect a change in a position of the second driving magnet 3231 by comparing signals detected by the second position sensors 3233 with each other. In a case where a plurality of second position sensors 3233 are arranged, at least two of the second position sensors 3233 may be disposed parallel to each other in a direction perpendicular to the second rotation axis R2.

The reflective holder 3200 may be supported in the rotatable holder 3300 by virtue of a magnetic force (hereinafter referred to as the second magnetic force) generated by a pair of magnetic bodies 3240 and 3340. The pair of magnetic bodies 3240 and 3340 may include a first magnetic body 3240 fixed to the reflective holder 3200 and a second magnetic body 3340 fixed to the rotatable holder 3300 and magnetically interacting with the first magnetic body 3240.

In example embodiments, the first magnetic body 3240 may be a pulling yoke disposed on the reflective holder 3200, and the second magnetic body 3340 may be a pulling magnet disposed on the rotatable holder 3300. By virtue of a magnetic attraction between the pulling magnet 3340 and the pulling yoke 3240, the reflective holder 3200 may be supported in the rotatable holder 3300 with the second ball members 3430 interposed therebetween. In this case, the pulling magnet 3340 may be a separate magnet distinguished from the second driving magnet 3231 of the second driving unit 3230. For example, as illustrated in FIG. 9 or 10, the pulling magnet 3340 may be disposed on the rotatable holder 3300 separately from the second driving magnet 3231 disposed on the reflective holder 3200. By separately providing the second driving magnet 3231 and the pulling magnet 3430 as described above, it is possible to form a more accurate and stable support structure.

In the reflective module 3000, the pulling magnet 3340 and the pulling yoke 3240 may be disposed to face each other in the second direction (the Y-axis direction). The second direction (the Y-axis direction) may be a direction perpendicular to the first direction (the Z-axis direction), which is a direction in which the first driving magnet 3331 and the first driving coil 3332 of the rotatable holder 3300 face each other. Since the pulling magnet 3340 and the pulling yoke 3240 are disposed to face each other in the second direction (the Y-axis direction), the reflective holder 3200 may be supported in the rotatable holder 3300 in the second direction (the Y-axis direction) by virtue of the second magnetic force.

Referring to FIG. 10, the second driving magnet 3231 and the pulling magnet 3340 may be disposed to be spaced apart from each other. The reflective holder 3200 may have an extension 3210 extending between the rotatable holder 3300 and the housing 1100, and the second driving magnet 3231 may be disposed on the extension 3210. Accordingly, the second driving magnet 3231 may be disposed as close as possible to the second driving coil 3232 by avoiding the pulling magnet 3340 of the rotatable holder 3300. In addition, according to this structure, the second driving magnet 3231 may directly face the second driving coil 3232 in the second direction (the Y-axis direction), and at the same time, the pulling magnet 3340 and the pulling yoke 3240 may also directly face each other in the second direction (the Y-axis direction).

The second driving magnet 3231 may be disposed between the pulling magnet 3340 and the second driving coil 3232. For example, as illustrated in FIG. 10, the second driving magnet 3231 may be disposed in a portion facing the housing 1100 on the extension 3210 of the reflective holder 3200.

However, the support structure of the reflective holder 3200 is not limited to what has been described above. For example, in another embodiment, the pulling magnet 3340 and the pulling yoke 3240 may be disposed to face each other in the second direction (the Y-axis direction), and the second driving magnet 3231 may be disposed on a side surface of the reflective holder 3200 to face the second driving coil 3232 disposed on the housing 1100 in a third direction (an X-axis direction). In this case, the third direction (the X-axis direction) may be a direction perpendicular to both the first direction (the Z-axis direction) and the second direction (the Y-axis direction). Also, the third direction (the X-axis direction) may be substantially parallel to the second rotation axis R2 of the reflective holder 3200.

As the reflective member 3100, the reflective holder 3200, or the rotatable holder 3300 included in the reflective module 3000 moves, there is a risk of collision with other members adjacent to the reflective module 3000, e.g., the first lens module 2000 and the second lens module 4000. In particular, there is a concern that when the lenses included in the lens modules 2000 and 4000 and the reflective member 3100 collide with each other, sensitive optical components may be damaged. Thus, there is a demand for a structure capable of preventing such a problem.

In example embodiments, the reflective module 3000 may include dampers 3510 and 3520 capable of reducing impact energy or noise generated when colliding with another component of the camera module 100. For example, the reflective module 3000 may include a first damper 3510 and a second damper 3520 protruding from the reflective holder 3200 in the first direction (the Z-axis direction) and in the second direction (the Y-axis direction), respectively.

The first damper 3510 may protrude from the reflective holder 3200 toward the first lens module 2000. When the reflective holder 3200 rotates about the second rotation axis R2, the first damper 3510 may collide with the shield can 1200 above the housing 1100.

When the reflective holder 3200 is at a neutral position, a distance between the first damper 3510 and the shield can 1200 may be smaller than a distance between the reflective member 3100 and the first lens module 2000. Therefore, as the reflective holder 3200 rotates, the first damper 3510 may collide with the shield can 1200 before the reflective member 3100 collides with the first lens module 2000.

The second damper 3520 may protrude from the reflective holder 3200 toward the second lens module 4000. When the reflective holder 3200 rotates about the first rotation axis R1, the second damper 3520 may collide with the housing 1100 before the reflective member 3100 to absorb an impact energy.

When an impact is applied to the camera module 100 from the outside, a dent may occur in the reflective module 3000. For example, there is a concern that when an external impact is conveyed to a contact surface between the ball member and the accommodation groove or the guide groove, the accommodation groove or the guide groove may be deformed, and accordingly the relative positions of the rotatable holder 3300 and the housing 1100 or the relative positions of the reflective holder 3200 and the rotatable holder 3300 may be changed.

There is a concern that this dent may act as an obstacle in precisely controlling the rotation of the reflective module 3000. For example, there is a concern that in the reflective module 3000 designed so that the second position sensor 3233 faces the neutral region 3231*a* of the second driving magnet 3231 when the reflective holder 3200 is at a neutral position, if the positions of the reflective holder 3200 and the second driving magnet 3231 are changed by the dent, and the second position sensor 3233 faces a portion (e.g., the N pole or the S pole) other than the neutral region 3231*a* of the second driving magnet 3231, the sensing accuracy of the second position sensor 3233 may decrease.

Therefore, there is demand for a structure capable of accurately sensing a rotation amount of the reflective holder 3200 or the rotatable holder 3300 even if a dent occurs.

In example embodiments, the reflective module 3000 may be configured so that the first position sensor 3333 faces the neutral region 3331*a* of the first driving magnet 3331 even if the position of the rotatable holder 3300 is changed due to a dent.

Referring to FIG. 8 or 10, the first position sensor 3333, the first driving magnet 3331, and the first yoke 3334 of the reflective module 3000 may be disposed parallel to each other along the first direction (the Z-axis direction). For example, when the rotatable holder 3300 is at a neutral position, the first position sensor 3333 may be disposed to face the neutral region 3331*a* of the first driving magnet 3331 in the first direction (the Z-axis direction), and the first driving magnet 3331 and the first yoke 3334 may also be disposed to face each other in the first direction (the Z-axis direction). That is, the direction in which the first position sensor 3333 and the first driving magnet 3331 face each other may be the same as the direction in which the rotatable holder 3300 is supported in the housing 1100 by virtue of the first magnetic force.

When the first accommodation groove 1120 is depressed due to an occurrence of a dent, the rotatable holder 3300 may be further pulled toward the housing 1100 in the first direction (the Z-axis direction) by virtue of the magnetic attraction (i.e., the first magnetic force) between the first driving magnet 3331 and the first yoke 3334. In this case, the first position sensor 3333 may still face the neutral region 3331*a* of the first driving magnet 3331, although the distance between the first position sensor 3333 and the first driving magnet 3331 in the first direction (Z-axis direction) decreases. Accordingly, even if a dent occurs, the first position sensor 3333 remains facing the neutral region 3331*a* of the first driving magnet 3331, making it possible to accurately detect a change in a magnetic flux of the first driving magnet 3331 passing through the first position sensor 3333 according to the movement of the N pole or the S pole and accurately measure an amount of movement of the rotatable holder 3300.

In example embodiments, the reflective module 3000 may be configured so that even if the relative positions of the reflective holder 3200 and the rotatable holder 3300 are changed due to a dent, the second position sensor 3233 is disposed to face the neutral region 3231*a* of the second driving magnet 3231.

Referring to FIGS. 8, 9, and 11, the second position sensor 3233, the second driving magnet 3231, and the pair of magnetic bodies 3240 and 3340 of the reflective module 3000 may be disposed parallel to each other in the second direction (the Y-axis direction). For example, when the reflective holder 3200 is at a neutral position, the second position sensor 3233 may be disposed to face the neutral region 3231*a* of the second driving magnet 3231 in the second direction (the Y-axis direction), and the pair of magnetic bodies 3240 and 3340 disposed on the reflective holder 3200 and the rotatable holder 3300, respectively, may also be disposed to face each other in the second direction (the Y-axis direction). That is, the direction in which the second position sensor 3233 and the second driving magnet 3231 face each other may be the same as the direction in which the reflective holder 3200 is supported in the rotatable holder 3300 by virtue of the second magnetic force.

When the shape of the second accommodation groove 3310 or the third accommodation groove 3220 is deformed due to an occurrence of a dent, the reflective holder 3200 may be further pulled toward the rotatable holder 3300 in the second direction (the Y-axis direction) by virtue of the magnetic attraction (i.e., the second magnetic force) between the pair of magnetic bodies 3240 and 3340, and accordingly the second driving magnet 3231 of the reflective holder 3200 may become closer to the second position sensor 3233 disposed on the housing 1100 in the second direction (the Y-axis direction).

Although the distance between the second position sensor 3233 and the second driving magnet 3231 the second direction (Y-axis direction) decreases, the second position sensor 3233 may still face the neutral region 3231*a* of the second driving magnet 3231. Accordingly, even if a dent occurs, the second position sensor 3233 remains facing the neutral region 3231*a* of the second driving magnet 3231, making it possible to accurately detect a change in a magnetic flux of the second driving magnet 3231 passing through the second position sensor 3233 according to the movement of the N pole or the S pole and accurately measure an amount of movement of the reflective holder 3200.

Figure 12:
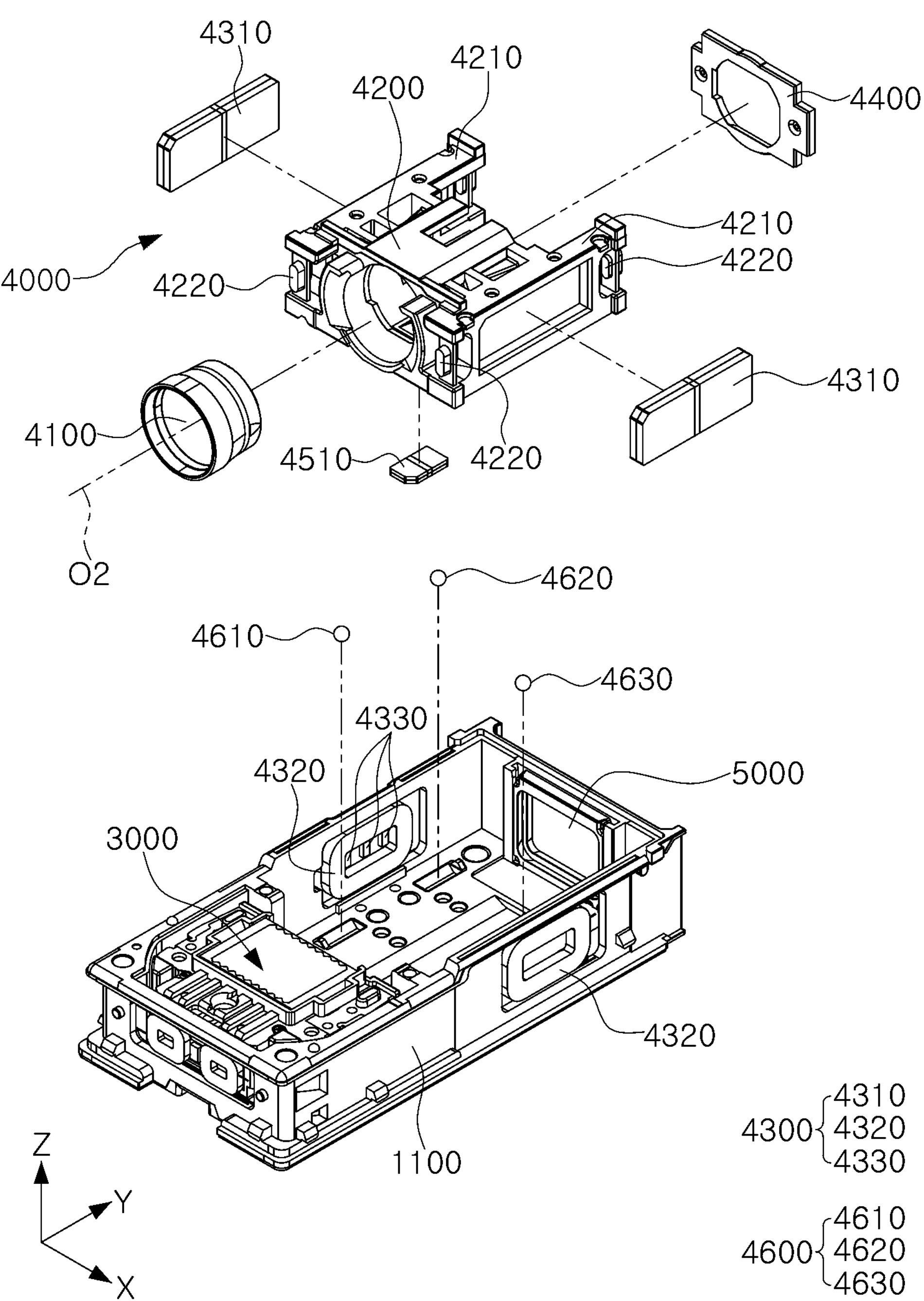
FIG. 12 is an exploded perspective view of the second lens module.
Figure 13:
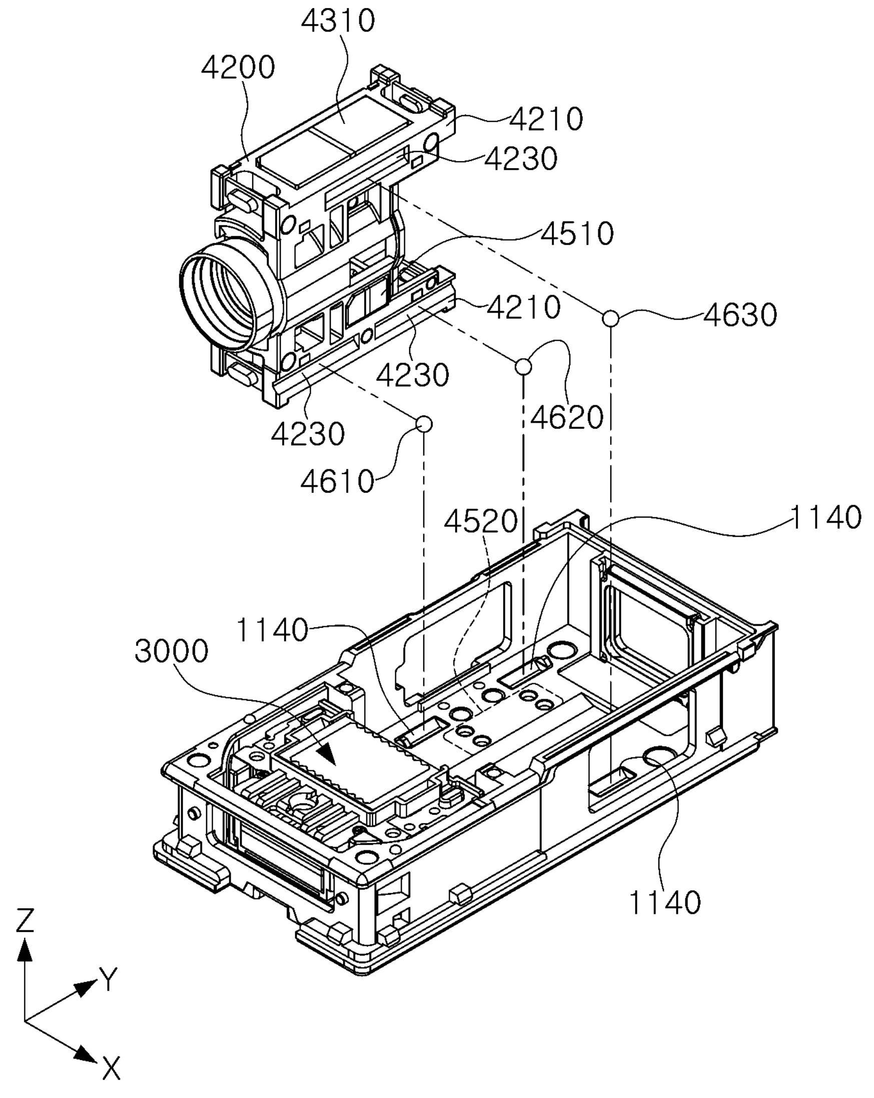
FIG. 13 is a reference diagram illustrating a state in which the second lens module is disposed in the housing.
Figure 14:
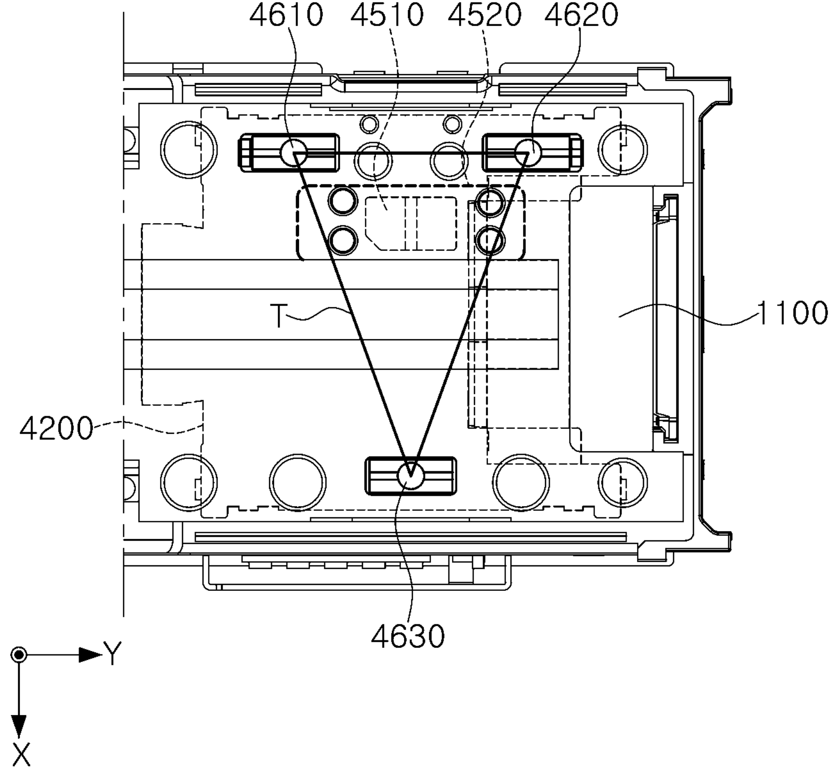
FIG. 14 is a reference diagram for explaining a positional relationship between support points of the second lens module and a pulling magnet.
Figure 15:
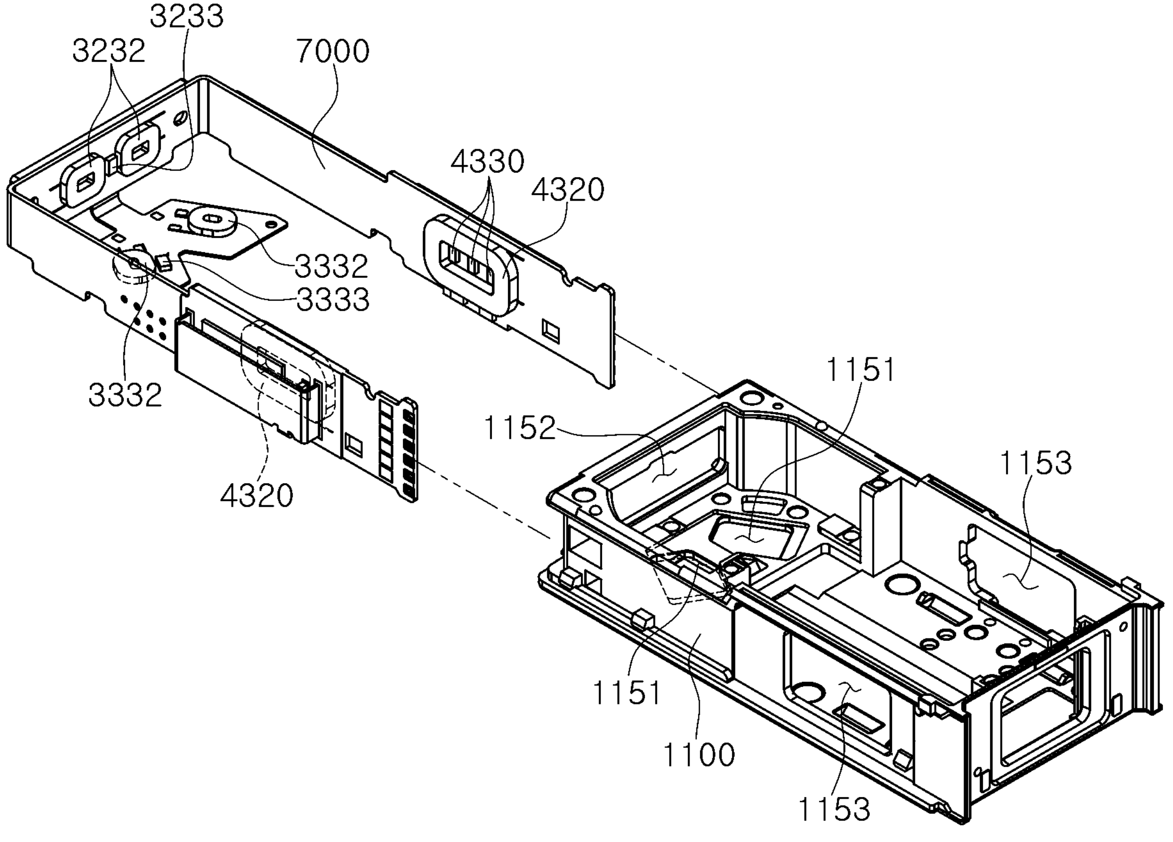
FIG. 15 is a reference diagram for explaining a combination of the housing with a circuit board.

Hereinafter, the second lens module 4000 included in the camera module 100 will be described with reference to FIGS. 12 through 15. FIG. 12 is an exploded perspective view of the second lens module 4000. FIG. 13 is a reference diagram illustrating a state in which the second lens module 4000 is disposed in the housing 1100. FIG. 14 is a reference diagram for explaining a positional relationship between support points of the second lens module 4000 and a pulling magnet. FIG. 15 is a reference diagram for explaining a combination of the housing 1100 with a circuit board. Since the second lens module 4000 and the camera module 100 including the same to be described with reference to FIGS. 12 through 15 correspond to the second lens module 4000 and the camera module 100 described with reference to FIGS. 1 through 11 above, any overlapping description may be omitted.

The camera module 100 may include a second lens module 4000 through which light emitted from the reflective module 3000 passes. The second lens module 4000 may include one or more lenses 4100 disposed along the second optical axis O2. The light emitted from the reflective module 3000 may be refracted by the one or more lenses 4100 of the second lens module 4000 and incident onto the image sensor 5000 behind the second lens module 4000.

Referring to FIG. 12, the second lens module 4000 may include one or more lenses 4100, a second lens holder 4200 supporting the one or more lenses 4100, and a third driving unit 4300 generating a driving force capable of moving the second lens holder 4200 relative to the housing 1100. The one or more lenses 4100 of the second lens module 4000 may be moved in a direction parallel to the second optical axis O2 by the third driving unit 4300. However, the configuration of the second lens module 4000 is not limited to what is illustrated in the drawings. For example, the second lens module 4000 may include a plurality of sub-lens modules each accommodating one or more lenses, and the sub-lens modules may be configured to be movable independently from each other in a direction parallel to the second optical axis O2.

The third driving unit 4300 may include a third driving magnet 4310 and a third driving coil 4320 facing each other, and a third position sensor 4330 detecting an amount of movement of the third driving magnet 4310.

Referring to FIG. 12, the third driving magnet 4310 may be disposed on the second lens holder 4200 of the second lens module 4000, and the third driving coil 4320 may be disposed on the housing 1100. The third driving coil 4320 and the third driving magnet 4310 may face each other in a direction perpendicular to the second optical axis O2. The second lens holder 4200 may move in a direction parallel to the second optical axis O2 by an electromagnetic interaction between the third driving coil 4320 and the third driving magnet 4310.

A surface of the third driving magnet 4310 facing the third driving coil 4320 may be configured so that different magnetic polarities are sequentially arranged along a movement direction of the second lens module 4000.

The third position sensor 4330 may be disposed inside or outside the third driving coil 4320 to face the third driving coil 4320. The third position sensor 4330 may be a magnetic sensor. For example, the third position sensor 4330 may include a Hall sensor.

A plurality of third position sensors 4330 may be arranged. For example, as illustrated in FIG. 12, a plurality of third position sensors 4330 may be disposed parallel to each other along the movement direction of the second lens module 4000. According to this position sensor arrangement structure, even if the third driving magnet 4310 moves inside the housing 1100 with a long stroke range, it is possible to accurately detect a position of the third driving magnet 4310.

The second lens module 4000 may include a plurality of ball members 4600 disposed between the second lens holder 4200 and the housing 1100. For example, as illustrated in FIGS. 12 and 13, three ball members 4610, 4620, and 4630 may be disposed between the second lens holder 4200 and the housing 1100, thereby enabling the second lens holder 4200 to move smoothly inside the housing 1100.

The plurality of ball members 4600 may include a third ball member 4610, a fourth ball member 4620, and a fifth ball member 4630 disposed to be spaced apart from each other. The plurality of ball members 4600 may move in a rolling manner along guide grooves 4230 (hereinafter referred to as fifth guide grooves) formed in the second lens holder 4200 and guide grooves 1140 (hereinafter referred to as sixth guide grooves) formed in a lower surface of the housing 1100.

In order to prevent an impact and a noise from occurring when the second lens module 4000 collides with an inner surface of the housing 1100 while moving, a plurality of dampers 4220 may be disposed on the second lens holder 4200.

The second lens module 4000 may further include a light blocking member 4400 preventing a flare phenomenon. The light blocking member 4400 may be a frame-like member disposed on a surface of the second lens holder 4200 facing the image sensor 5000, and may block unnecessary light in the light passing through the second lens module 4000 to prevent a flare phenomenon.

The fifth guide grooves 4230 and the sixth guide grooves 1140 may be disposed in the second lens holder 4200 and in the lower surface of the housing 1100, respectively, so that the second lens module 4000 may move stably in the second optical axis O2 direction.

The fifth guide grooves 4230 and the sixth guide grooves 1140 may extend along the second optical axis O2 direction, and may be configured to accommodate the plurality of ball members 4600, respectively, so that the plurality of ball members 4600 are movable in a rolling manner.

The fifth guide groove 4230 and the sixth guide groove 1140 may have a V-shaped cross section or a U-shaped cross section, but the specific cross-sectional shape thereof is not limited thereto.

The second lens holder 4200 may have an extension 4210 extending rearward, and the fifth guide grooves 4230 may extend to the extension 4210 to form a long stroke of the second lens module 4000.

The second lens module 4000 may be supported in a direction perpendicular to the second optical axis O2 by virtue of a magnetic force generated from a pair of magnetic bodies 4510 and 4520.

Referring to FIG. 13, a third magnetic body 4510 may be disposed on a lower surface of the second lens holder 4200, and a fourth magnetic body 4520 facing the third magnetic body 4510 may be disposed on the housing 1100. One of the third magnetic body 4510 and the fourth magnetic body 4520 may be a pulling magnet, and the other one may be a pulling yoke.

By virtue of a magnetic attraction (hereinafter referred to as the third magnetic force) generated between the third magnetic body 4510 and the fourth magnetic body 4520, the second lens holder 4200 may move while being positioned very close to the bottom surface of the housing 1100 with the plurality of ball members 4600 interposed therebetween.

In order to stably support the second lens holder 4200, the third magnetic body 4510 may be disposed inside a support region T formed by the plurality of ball members 4600. For example, the second lens holder 4200 may have three support points formed by the three ball members 4610, 4620, and 4630, respectively, and accordingly, a triangular support region T may be formed with the three support points being vertices thereof.

If a point at which the third magnetic force acts is formed inside the support region T, the second lens holder 4200 may be stably supported in the housing 1100. However, if the third magnetic body 4510 is positioned outside the support region T, a point at which the third magnetic force acts is beyond the support region T, and the second lens holder 4200 may be tilted or at least some of the plurality of ball members 4600 may escape from the guide grooves 1140 and 4230.

In order to prevent such a problem, the third magnetic body 4510 may be disposed inside the support region T formed by the plurality of ball members 4600. Accordingly, a point at which the third magnetic force acts may be located inside the support region T, so that the second lens holder 4200 is stably supported in the housing 1100.

While the second lens holder 4200 moves in the second optical axis O2 direction, the plurality of ball members 4600 may move in a rolling manner by a predetermined distance, and thus, the supporting region T may be changed continuously. For example, as the three ball members 4610, 4620, and 4630 move in FIG. 14, the shape of the triangle formed by the three support points may be changed. If the third magnetic body 4510 is positioned close to the fifth ball member 4630, a point at which the third magnetic force acts may be beyond the support region T according to a change in the support region T.

Accordingly, the third magnetic body 4510 may be disposed close to the third ball member 4610 or the fourth ball member 4620 so that a point at which the third magnetic force acts may be stably located inside the support region T even if the range of the support region T is changed. That is, a distance between the third magnetic body 4510 and the third ball member 4610, or a distance between the third magnetic body 4510 and the fourth ball member 4620, may be smaller than a distance between the third magnetic body 4510 and the fifth ball member 4630. Accordingly, even if the second lens holder 4200 moves with a long stroke, a point at which the third magnetic force acts may be stably located inside the support region T, thereby stably supporting the second lens holder 4200 inside the housing 1100.

In the camera module 100, the driving coils 3232, 3332, and 4320 for moving the reflective member 3100 and the second lens holder 4200 may be disposed on a circuit board 7000 and exposed to the internal space of the housing 1100. For example, referring to FIG. 15, the first driving coil 3332, the second driving coil 3232, and the third driving coil 4320 may be disposed on the circuit board 7000, and may be exposed to the internal space of the housing 1100 through openings 1151, 1152, and 1153 of the housing 1100.

As illustrated in FIG. 15, all of the first driving coil 3332, the second driving coil 3232, and the third driving coil 4320 may be disposed on the same circuit board 7000, but the disposition of the first driving coil 3332, the second driving coil 3232, and the third driving coil 4320 is not limited thereto. The first driving coil 3332, the second driving coil 3232, and the third driving coil 4320 may be disposed on different circuit boards, respectively, and exposed to the internal space of the housing 1100.

Hereinafter, reinforcing members included in the camera module according to example embodiments will be described with reference to FIG. 16.

Figure 16:
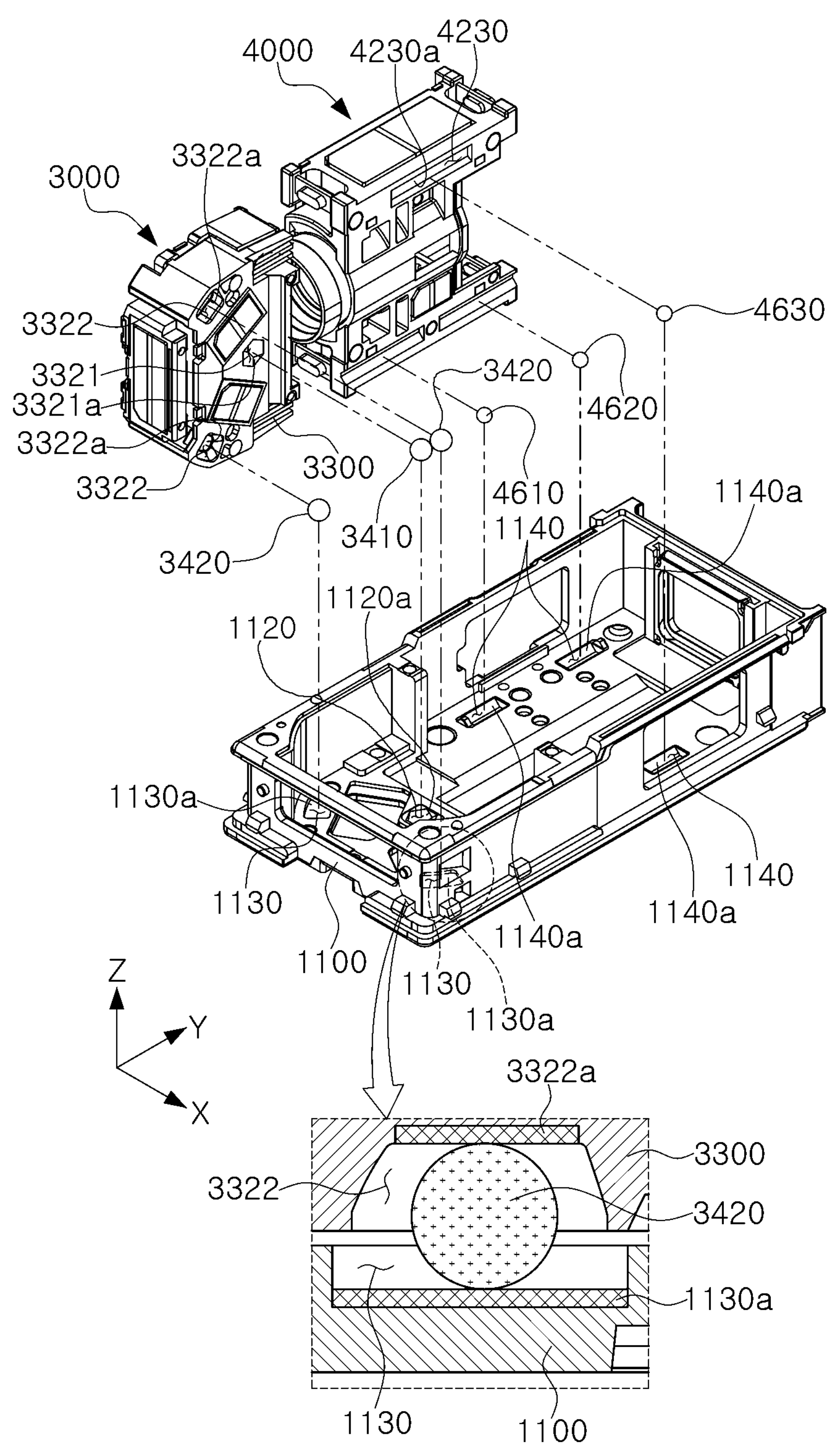
FIG. 16 illustrates a state in which reinforcing members are disposed in the housing, the reflective module, and the second lens module of the camera module.

FIG. 16 illustrates a state in which reinforcing members are disposed in the housing 1100, the reflective module 3000, and the second lens module 4000 of the camera module 100. Since the housing 1100, the reflective module 3000, and the second lens module 4000 and the camera module 100 including the same to be described with reference to FIG. 16 correspond to the housing 1100, the reflective module 3000, the second lens module 4000, and the camera module 100 described with reference to FIGS. 1 through 15 above, any overlapping description may be omitted.

When an impact is applied to the camera module 100, the impact may be transmitted to a ball member and a contact surface contacting the ball member, which may cause a deformation of a shape of the contact surface. For example, the reflective module 3000 and the housing 1100 may be disposed to face each other with the first ball member 3410 and the guide ball members 3420 interposed therebetween. In this case, the impact may be concentrated on a narrow contact surface between the first ball member 3410 or the guide ball members 3420 and the housing 1100, or between the first ball member 3410 or the guide ball members 3420 and the reflective module 3000, causing a dent or a deformation of the contact surface.

In order to prevent such a dent, the camera module 100 may further include a plurality of reinforcing members 1120*a*, 1130*a*, 1140*a*, 3321*a*, 3322*a*, and 4230*a* disposed at portions contacting the first ball member 3410, the guide ball members 3420, the third ball member 4610, the fourth ball member 4620, and the fifth ball member 4630.

For example, in the camera module 100, the reinforcing members 1120*a*, 1130*a*, 3321*a*, and 3322*a* having an excellent mechanical rigidity may be disposed in the first accommodation groove 1120 and the third guide grooves 1130 of the housing 1100, and the groove 3321 and the fourth guide grooves 3322 of the rotatable holder 3300, in which the first guide ball member 3410 and the guide ball members 3420 are accommodated.

Accordingly, as illustrated in a partially enlarged view of FIG. 16, an upper end and a lower end of the guide ball members 3420 may be in contact with the reinforcing members 1130*a* and 3322*a*.

The reinforcing members 1120*a*, 1130*a*, 3321*a*, and 3322*a* may be disposed on at least some of the portions of the rotatable holder 3300 or the housing 1100 that may come into contact with the first guide ball member 3410 and the guide ball members 3420. For example, the reinforcing members 1120*a*, 1130*a*, 3321*a*, and 3322*a* may be disposed in the first accommodation groove 1120 of the housing 1100 accommodating the first ball member 3410, the groove 3321 of the rotatable holder 3300 accommodating the first ball member 3410, the third guide grooves 1130 of the housing 1100 accommodating the guide ball members 3420, and the fourth guide grooves 3322 of the rotatable holder 3300 accommodating the guide ball members 3420.

The reinforcing members 1140*a* may be disposed in the sixth guide grooves 1140 of the housing 1100 accommodating the third ball member 4610, the fourth ball member 4620, and the fifth ball member 4630 for guiding the movement of the second lens module 4000, and the reinforcing members 4230*a* may be disposed in the fifth guide grooves 4230 of the second lens module 4000 accommodating the third ball member 4610, the fourth ball member 4620, and the fifth ball member 4630.

In addition, although not illustrated in FIG. 16, reinforcing members may also be disposed at portions of the rotatable holder 3300 and the reflective holder 3200 in FIGS. 8 through 1100 contacting the second ball members 3430.

In the reinforcing members 1120*a*, 1130*a*, 1140*a*, 3321*a*, 3322*a*, and 4230*a* included in the camera module 100, surfaces contacting respective ones of the first ball member 3410, the guide ball members 3420, the third ball member 4610, the fourth ball member 4620, and the fifth ball member 4630 may have different shapes. For example, the reinforcing members 1120*a* and 3321*a* may have surfaces inclined in different directions so that the first ball member 3410 may easily rotate without changing its position, while the reinforcing members 1130*a* and 3322*a* may have a flat surface so that the guide ball members 3420 nay easily roll. However, the specific shapes of the reinforcing members 1120*a*, 1130*a*, 3321*a*, and 3322*a* are not limited to what has been described above.

The reinforcing members may be made of a material having a higher rigidity than a material of the structures on which the reinforcing members are disposed. For example, the rotatable holder 3300 the housing 1100, and the second lens module 4000 may be made of a plastic material, and the reinforcing members 1120*a*, 1130*a*, 1140*a*, 3321*a*, 3322*a*, and 4230*a* disposed on the rotatable holder 3300, the housing 1100, and the second lens module 4000 may be made of a material for example, a non-magnetic metal material such as stainless steel, having a higher rigidity than plastic. Accordingly, it is possible to prevent the portions of the rotatable holder 3300, the housing 1100, and the second lens module 4000 contacting the first ball member 3410, the guide ball members 3420, the third ball member 4610, the fourth ball member 4620, and the fifth ball member 4630 from being deformed or damaged by an impact applied to the camera module 100.

The reinforcing members may be integrally formed with the structures on which the reinforcing members are disposed. For example, the reinforcing member 1130*a* disposed in the third guide groove 1130 of the housing 1100 may be integrally formed with the housing 1100 by insert injection molding. In a case where the housing 1100 is made of a plastic material, the reinforcing member 1130*a* may be integrated with the housing 1100 during manufacturing by injecting a resin material into a mold in a state where the reinforcing member 1130*a* is fixed in the mold.

However, how to attach the reinforcing members is not limited to the above-described insert injection molding. For example, the reinforcing members may be fixed to the housing 1100, the rotatable holder 3300, the reflective holder 3200, and the second lens module 4000 using an adhesive or any other suitable attachment method.

By placing the reinforcing members at the portions contacting the ball members in the camera module 100 according to example embodiments, it is possible to drastically reduce dents or deformations of the surfaces contacting the ball members even when impacts are applied to the camera module 100.

As a result, the rotatable holder 3300 and the second lens module 4000 can stably move with respect to the housing 1100 in spite of an external impact, and the reflective holder 3200 can stably move with respect to the rotatable holder 3300, and the sensing accuracy of the position sensors 3233 and 3333 in FIG. 8 detecting positions of components moving relative to each other can be kept constant at all times.

As set forth above, according to the example embodiments in the present disclosure, it is possible to provide a camera module having more lens modules without increasing an overall length thereof by disposing the lens modules in front of and behind the reflective module.

In addition, according to the example embodiments in the present disclosure, it is possible to provide a reflective module and a camera module having a structure capable of accurately detecting an amount of movement of a moving object even if an external impact is applied thereto.

While this disclosure includes specific examples, it will be apparent after an understanding of the disclosure of this application that various changes in form and details may be made in these examples without departing from the spirit and scope of claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:

a first lens module comprising one or more lenses disposed along a first optical axis; and a reflective module into which light emitted from the first lens module is incident along the first optical axis, the reflective module comprising:

a housing having an internal space;

a rotatable holder supported in the housing in a first direction parallel to the first optical axis, and configured to be rotatable relative to the housing;

a reflective holder supported in the rotatable holder in a second direction different from the first direction, and configured to be rotatable relative to the rotatable holder;

a reflective member disposed on the reflective holder and configured to reflect the light incident along the first optical axis to a second optical axis parallel to the second direction;

a first ball member forming a rotation axis of the rotatable holder and through which an imaginary line extending along the first optical axis passes;

a driving magnet and a driving coil configured to rotate the reflective holder; and a pair of magnetic bodies configured to provide a magnetic force to support the reflective holder in the rotatable holder, wherein the driving magnet and the driving coil face each other in a direction parallel to the second direction in which the reflective holder is supported in the rotatable holder, the pair of magnetic bodies comprises a single first magnetic body separate from the driving magnet and disposed on the reflective holder, and a single second magnetic body separate from the driving magnet and disposed on the rotatable holder, the single first magnetic body and the single second magnetic body face each other in the second direction, and an imaginary line extending along the second optical axis passes through the single second magnetic body.

2. The camera module of claim 1, further comprising a plurality of second ball members disposed between the reflective holder and the rotatable holder and forming a rotation axis of the reflective holder.

3. The camera module of claim 2, further comprising a plurality of accommodation grooves formed in either one or both of the reflective holder and the rotatable holder, wherein the plurality of second ball members are respectively disposed in the plurality of accommodation grooves in the second direction.

4. The camera module of claim 2, wherein the rotation axis of the reflective holder passes through the plurality of second ball members, and the reflective member is disposed between the plurality of second ball members.

5. The camera module of claim 1, wherein the driving magnet is disposed on the reflective holder and the driving coil is disposed on the housing, or the driving magnet is disposed on the housing and the driving coil is disposed on the reflective holder.

6. The camera module of claim 5, wherein the reflective holder comprises an extension disposed between the rotatable holder and the housing, the driving coil is disposed on the housing, and the driving magnet is disposed on the extension facing the driving coil in the second direction.

7. The camera module of claim 6, further comprising a position sensor disposed on the housing and facing the driving magnet in the second direction.

8. The camera module of claim 7, wherein the driving magnet is configured so that a surface of the driving magnet facing the driving coil has an N pole, a neutral region, and an S pole arranged in the first direction, and the position sensor faces the neutral region.

9. The camera module of claim 1, wherein the single second magnetic body is disposed between the driving magnet and the single first magnetic body.

10. The camera module of claim 1, further comprising:

a driving magnet and a driving coil configured to rotate the rotatable holder; and a magnetic body configured to provide a magnetic force by interacting with the driving magnet configured to rotate the rotatable holder to support the rotatable holder in the housing, wherein the magnetic body and the driving magnet configured to rotate the rotatable holder face each other in the first direction with the driving coil configured to rotate the rotatable holder being interposed therebetween.

11. The camera module of claim 10, further comprising a position sensor facing the driving magnet configured to rotate the rotatable holder in the first direction.

12. The camera module of claim 10, further comprising an accommodation groove formed in either one or both of the housing and the rotatable holder and supporting the first ball member at three or more points.

13. The camera module of claim 10, further comprising a plurality of guide ball members configured to guide a rotation of the rotatable holder, wherein the plurality of guide ball members are configured to be movable relative to the first ball member in a direction perpendicular to the first direction.

14. The camera module of claim 1, further comprising a damper disposed on the reflective holder and protruding toward the first lens module.

15. The camera module of claim 1, further comprising a second lens module into which the light reflected from the reflective member is incident, the second lens module comprising one or more lenses disposed along the second optical axis.

16. The camera module of claim 1, wherein the driving magnet is a flat magnet.

17. A camera module comprising:

a first lens module having a first optical axis and a second lens module having a second optical axis different from the first optical axis; and a reflective module comprising:

a housing having an internal space;

a rotatable holder disposed in the internal space of the housing and configured to be rotatable about a first rotation axis;

a reflective holder configured to be rotatable relative to the rotatable holder about a second rotation axis perpendicular to the first rotation axis;

a reflective member disposed on the reflective holder and configured to reflect light received along the first optical axis to the second optical axis;

a driving unit comprising a driving magnet and a driving coil facing each other in a direction parallel to the second optical axis and configured to rotate the reflective holder, and a pair of magnetic bodies configured to provide a magnetic force to support the reflective holder in the rotatable holder, wherein the reflective holder is supported in the rotatable holder in a direction parallel to the second optical axis, the pair of magnetic bodies comprises a single first magnetic body separate from the driving magnet and disposed on the reflective holder, and a single second magnetic body separate from the driving magnet and disposed on the rotatable holder, the single first magnetic body and the single second magnetic body face each other in a direction parallel to the second optical axis, and an imaginary line extending along the second optical axis passes through the single second magnetic body.

18. The camera module of claim 17, wherein the rotatable holder is supported in the housing in a first direction parallel to the first rotation axis by a first magnetic force, and the reflective holder is supported in the rotatable holder in a second direction perpendicular to the first direction by a second magnetic force.

19. The camera module of claim 18, wherein the camera module further comprises:

a first driving magnet disposed on the rotatable holder; and a first pulling yoke disposed on the housing, and the first magnetic force is generated by the first driving magnet and the first pulling yoke.

20. The camera module of claim 18, wherein the single first magnetic body and the single second magnetic body are configured to generate the second magnetic force and rotate together with the rotatable holder as the rotatable holder rotates.

21. The camera module of claim 17, wherein the single first magnetic body is disposed between the driving magnet and the single second magnetic body.

22. The camera module of claim 17, wherein the single first magnetic body is a pulling magnet, and the single second magnetic body is a second pulling yoke.

23. The camera module of claim 17, wherein the driving magnet is a flat magnet.

24. A reflective module comprising:

a rotatable holder configured to be rotatable about a first axis;

a reflective holder coupled to the rotatable holder and configured to be rotatable about a second axis perpendicular to the first axis;

a reflective member coupled to the reflective holder;

a driving magnet disposed on the reflective holder;

a driving coil configured to interact with the driving magnet;

a single first magnetic body separate from the driving magnet and disposed on the reflective holder; and a single second magnetic body separate from the driving magnet and disposed on the rotatable holder;

wherein the driving magnet and the driving coil face each other in a direction parallel to a third axis perpendicular to both the first axis and the second axis, the single first magnetic body and the single second magnetic body face each other in a direction parallel to the third axis, the reflective member is configured to reflect light received along a first optical axis parallel to the first axis to a second optical axis parallel to the third axis, and an imaginary line extending along the second optical axis passes through the single second magnetic body.

25. The reflective module of claim 24, wherein the single first magnetic body is disposed between the second axis and the single second magnetic body.

26. The reflective module of claim 24, further comprising a position sensor configured to detect a movement of the driving magnet.

27. The reflective module of claim 26, wherein the single first magnetic body, the single second magnetic body, the driving magnet, and the position sensor are sequentially disposed in a direction parallel to the third axis.

28. The reflective module of claim 26, further comprising a housing having an internal space and an opening in the housing exposing the internal space, wherein the rotatable holder is disposed in the housing; and the driving coil and the position sensor are exposed to the internal space of the housing through the opening in the housing.

29. The reflective module of claim 24, further comprising a ball member through which the second axis passes, wherein the ball member is disposed between a first accommodation groove formed in the rotatable holder and a second accommodation groove formed in the reflective holder, and the first accommodation groove and the second accommodation groove face each other in a direction parallel to the third axis.

30. A camera module comprising:

the reflective module of claim 24;

a first lens module having the first optical axis; and a second lens module having the second optical axis.

31. The reflective module of claim 24, wherein the driving magnet is a flat magnet.

* * * * *